(12) United States Patent
Cho et al.

(10) Patent No.: US 9,363,570 B2
(45) Date of Patent: Jun. 7, 2016

(54) BROADCAST RECEIVING APPARATUS FOR RECEIVING A SHARED HOME SCREEN

(71) Applicant: LG ELECTRONICS INC., Seoul (KR)

(72) Inventors: Youngjoo Cho, Seoul (KR); Jinsu Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/277,419

(22) Filed: May 14, 2014

(65) Prior Publication Data
US 2014/0344862 A1    Nov. 20, 2014

(30) Foreign Application Priority Data

May 15, 2013   (KR) .................. 10-2013-0054803
May 24, 2013   (KR) .................. 10-2013-0058701

(51) Int. Cl.
| | |
|---|---|
| *H04N 21/485* | (2011.01) |
| *H04N 21/482* | (2011.01) |
| *H04N 21/475* | (2011.01) |
| *H04N 21/422* | (2011.01) |
| *H04N 21/431* | (2011.01) |

(52) U.S. Cl.
CPC ....... *H04N 21/4826* (2013.01); *H04N 21/4222* (2013.01); *H04N 21/42209* (2013.01); *H04N 21/431* (2013.01); *H04N 21/4753* (2013.01); *H04N 21/4858* (2013.01)

(58) Field of Classification Search
CPC .................. H04N 21/42204; H04N 21/42208; H04N 21/42209; H04N 21/4222; H04N 21/4753; H04N 21/4854; H04N 21/4858
See application file for complete search history.

(56) References Cited

U.S. PATENT DOCUMENTS

| | | | |
|---|---|---|---|
| 2005/0091539 A1* | 4/2005 | Wang et al. .................... 713/201 |
| 2010/0257473 A1* | 10/2010 | Kang .................... G06F 3/1454 715/769 |
| 2012/0081312 A1* | 4/2012 | Sirpal et al. .................... 345/173 |
| 2012/0088548 A1* | 4/2012 | Yun ........................ G08C 17/02 455/557 |
| 2012/0178496 A1* | 7/2012 | Hwang et al. .............. 455/550.1 |
| 2013/0023339 A1* | 1/2013 | Davis .................. G07F 17/3206 463/29 |
| 2014/0053189 A1* | 2/2014 | Lee et al. ........................ 725/37 |
| 2014/0075377 A1* | 3/2014 | Kang et al. .................... 715/788 |
| 2015/0163537 A1* | 6/2015 | Sirpal et al. .................... 725/37 |

* cited by examiner

*Primary Examiner* — James R Sheleheda
*Assistant Examiner* — Alexander Boyd
(74) *Attorney, Agent, or Firm* — Birch, Stewart, Kolasch & Birch, LLP

(57) ABSTRACT

Disclosed are a broadcast receiving apparatus and a method for operating the same. A broadcast receiving apparatus according to an embodiment of the present invention includes an interface to access an electronic device that stores home screen information including a background image and a plurality of execution items, and to receive the home screen information from the electronic device, a controller to scale at least one of the background image and the execution items of the received home screen information, and a display to display a home screen including the scaled background image and execution items. As such, user convenience may be improved.

13 Claims, 37 Drawing Sheets

(a) (b)

(a) (b)

(a)    (b)

(a)  (b)

(a)   (b)

BROADCAST RECEIVING APPARATUS FOR RECEIVING A SHARED HOME SCREEN

CROSS-REFERENCE TO RELATED APPLICATION

This application claims the priority benefit of Korean Patent Application Nos. 10-2013-0054803, filed on May 15, 2013 and 10-2013-0058701, filed on May 24, 2013 in the Korean Intellectual Property Office, the disclosure of which is incorporated herein by reference.

BACKGROUND OF THE INVENTION

1. Field of the Invention

The present invention relates to a broadcast receiving apparatus and a method for operating the same, and more particularly to a broadcast receiving apparatus capable of improving user convenience, and a method for operating the same.

2. Description of the Related Art

A broadcast receiving apparatus is an apparatus for receiving broadcast signals. A user may watch broadcast programs on the broadcast receiving apparatus. The broadcast receiving apparatus displays a broadcast program selected by the user on a display from among broadcast programs transmitted from broadcasting stations. The current trend in broadcasting around the world is shifted from analog broadcasting to digital broadcasting.

As it transmits digital audio/video (A/V) signals, digital broadcasting offers many advantages over analog broadcasting, for example, robustness against noise, less data loss, ease of error correction, and the ability to provide high-definition and clear images. In addition, unlike analog broadcasting, digital broadcasting allows interactive services.

SUMMARY OF THE INVENTION

Therefore, the present invention has been made in view of the above problems, and it is an object of the present invention to provide a broadcast receiving apparatus capable of improving user convenience, and a method for operating the same.

It is another object of the present invention to provide a broadcast receiving apparatus capable of receiving a shared home screen from another electronic device and displaying the received home screen, and a method for operating the same.

In accordance with an aspect of the present invention, the above and other objects can be accomplished by the provision of a broadcast receiving apparatus including an interface to access an electronic device that stores home screen information including a background image and a plurality of execution items, and to receive the home screen information from the electronic device, a controller to scale at least one of the background image and the execution items of the received home screen information, and a display to display a home screen including the scaled background image and execution items.

In accordance with another aspect of the present invention, there is provided a method for operating a broadcast receiving apparatus, the method including accessing an electronic device that stores home screen information including a background image and a plurality of execution items, receiving the home screen information from the electronic device, scaling at least one of the background image and the execution items of the received home screen information, and displaying a home screen including the scaled background image and execution items.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

The terms "module", "unit", and "--er" or "--or" used to signify components are used herein to help the understanding of the components and thus should not be construed as having specific meanings or functions. Accordingly, the terms "module", "unit", and "--er" or "--or" may be used interchangeably.

A broadcast receiving apparatus as set forth herein is an intelligent broadcast receiving apparatus equipped with a computer support function (e.g., Internet function) in addition to a broadcast reception function, and thus may have user-friendly interfaces such as a handwriting input device, a touch screen, or a three-dimensional (3D) pointing device. Furthermore, since wired or wireless Internet is supported, the broadcast receiving apparatus is capable of performing functions such as e-mailing, web browsing, banking, and gaming through connection to the Internet or a computer. For these various functions, a standard general-purpose operating system (OS) may be used.

That is, since various applications can be freely added to or deleted from a general-purpose OS kernel in the broadcast receiving apparatus according to the present invention, the broadcast receiving apparatus may perform a number of user-friendly functions. For example, the broadcast receiving apparatus may be a smart TV.

Figure 1A:
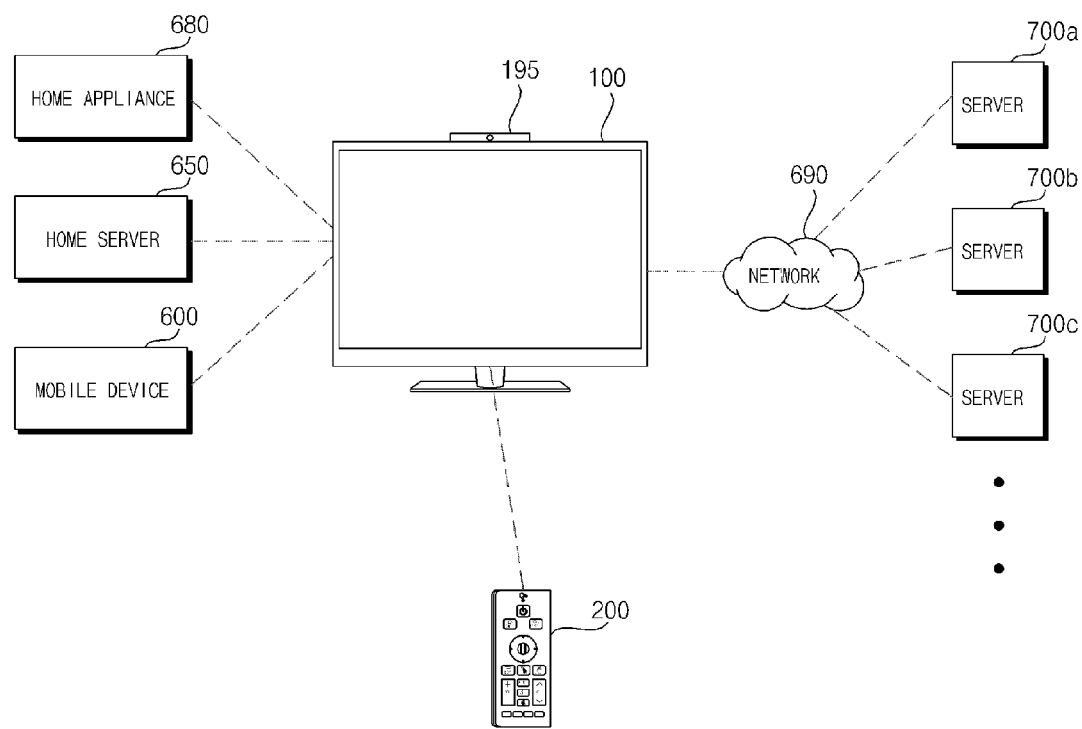
FIG. 1A is a diagram illustrating a broadcast receiving apparatus according to an embodiment of the present invention.

FIG. 1A is a diagram illustrating a broadcast receiving apparatus 100 according to an embodiment of the present invention.

Figure 2:
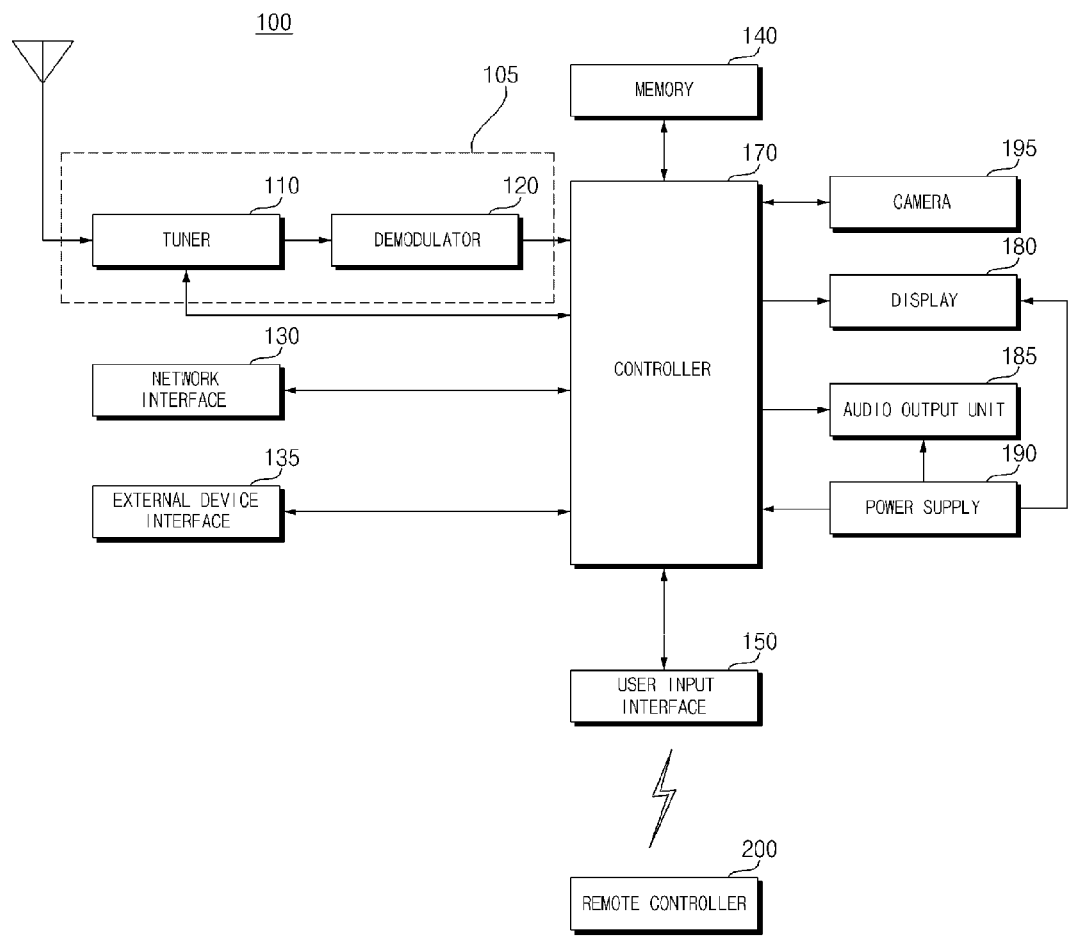
FIG. 2 is a block diagram of the broadcast receiving apparatus of FIG. 1A.

Referring to FIG. 1A, the broadcast receiving apparatus 100 is an apparatus for displaying images, and includes a display 180 (see FIG. 2). The broadcast receiving apparatus 100 further includes a camera 195 for capturing an image of a user.

Although the camera 195 is disposed on the broadcast receiving apparatus 100, the location of the camera 195 may be changed. Unlike FIG. 1A, the broadcast receiving apparatus 100 and the camera 195 may be provided as separate devices.

The broadcast receiving apparatus 100 may exchange data with each external device via a network or through one-to-one communication.

The broadcast receiving apparatus 100 may exchange data with adjacent external devices, for example, home appliances 680, a home server 650, and a mobile device 600. They may share certain content data. Here, the home appliances 680 may include a set-top box, sound equipment, a refrigerator, a vacuum cleaner, an air conditioner, a washing machine, cooking appliances, etc.

The broadcast receiving apparatus 100 may exchange data with external servers 700a, 700b, 700c, and . . . via a network 690. The external servers 700a, 700b, 700c, and . . . may be content providers for providing various contents.

Unlike FIG. 1A, the broadcast receiving apparatus 100 may exchange data with the mobile device 600 via the network 690.

A broadcast receiving apparatus according to an embodiment of the present invention may receive home screen information including a background image and a plurality of execution items from another electronic device, and thus display a home screen corresponding to the home screen information. That is, the broadcast receiving apparatus may receive a shared home screen from another electronic device, scale and convert the received home screen to be suitable for the broadcast receiving apparatus, and display the converted home screen.

As such, a home screen used by a specific user may be shared among a plurality of electronic devices and thus user convenience may be improved.

Particularly, since a home screen of a mobile device may be used as a home screen of a broadcast receiving apparatus (e.g., TV), a user may use the broadcast receiving apparatus as if the user uses the mobile device.

The broadcast receiving apparatus 100 may operate in response to a remote control signal received from a remote controller 200. To this end, the broadcast receiving apparatus 100 and the remote controller 200 may exchange data through, for example, paring.

Particularly, by exchanging data, the broadcast receiving apparatus 100 may display a pointer corresponding to motion of the remote controller 200, or display text input using character keys of the remote controller 200.

The broadcast receiving apparatus 100 according to the present invention may include a TV receiver, a monitor, a projector, a notebook computer, a digital broadcast receiver, etc.

The mobile device 600 according to the present invention may include portable devices, for example, a smart phone, a music player, a tablet, an e-book, a tab book, etc.

According to an embodiment of the present invention, the broadcast receiving apparatus 100 is an apparatus for displaying images, and may be a mobile broadcast receiving apparatus as well as a fixed broadcast receiving apparatus.

Figure 1B:
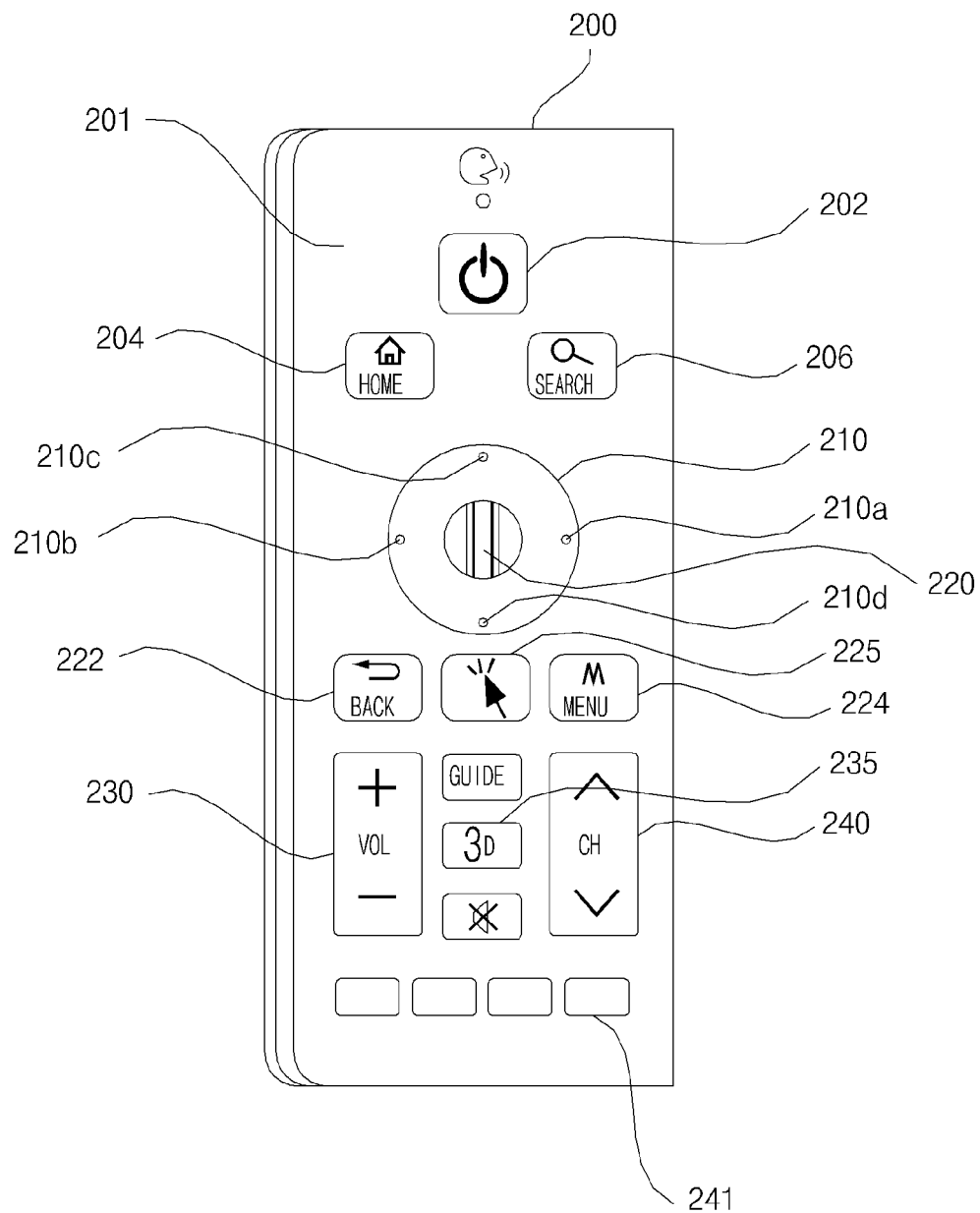
FIG. 1B is a diagram illustrating a first surface of a remote controller of FIG. 1A.
Figure 1C:
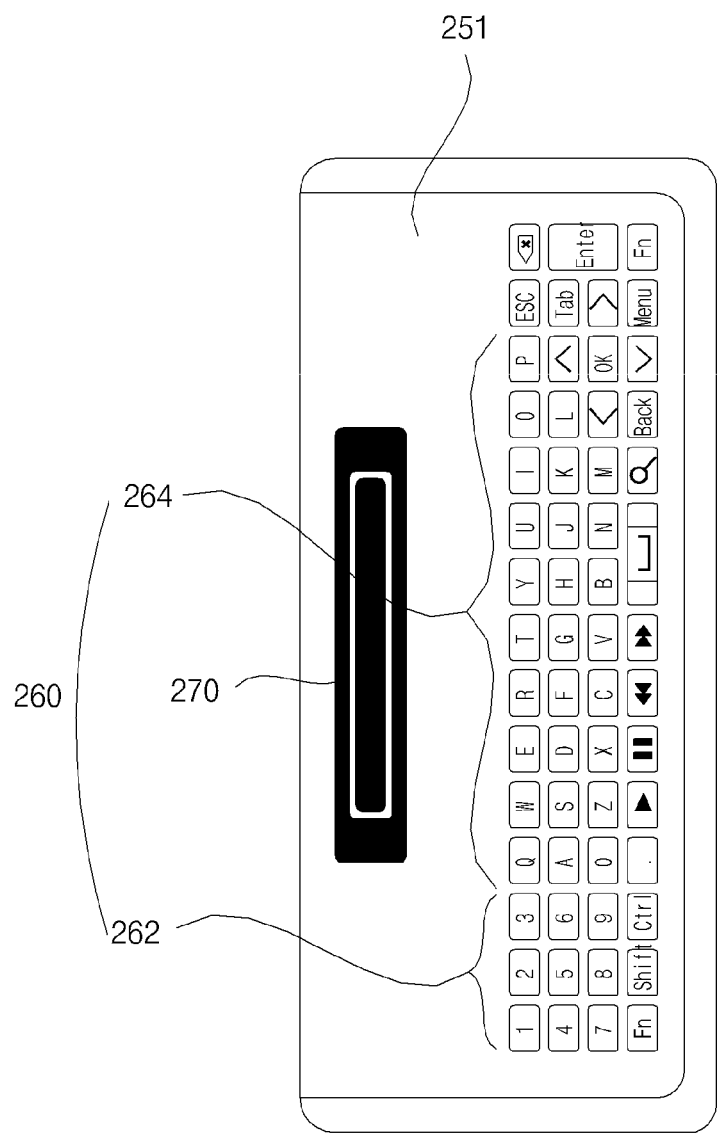
FIG. 1C is a diagram illustrating a second surface of the remote controller of FIG. 1A.

FIG. 1B is a diagram illustrating a first surface 201 of the remote controller 200 of FIG. 1A, and FIG. 1C is a diagram illustrating a second surface 251 of the remote controller 200 of FIG. 1A.

Referring to FIG. 1B, operation keys such as a power key 202 may be disposed on the first surface 201 (front surface) of the remote controller 200.

A description is now given of various operation keys. The power key 202 is used to power on or off the broadcast receiving apparatus 100. A home key 204 is used to display a home screen of the broadcast receiving apparatus 100 if the home screen is set. A search key 206 may be used to display a search bar on the broadcast receiving apparatus 100, or to perform a search function when a search word is input.

A four-direction key 210 is used to move a pointer or cursor horizontally and vertically, and may be integrally formed with an up key 210c, a down key 210d, a left key 210b, and a right key 210a. A wheel key 220 may be disposed at the center of the four-direction key 210.

The wheel key 220 is used to move a screen or items displayed on the broadcast receiving apparatus 100. The wheel key 220 may operate upward or downward and thus the screen or items displayed on the broadcast receiving apparatus 100 may move upward or downward.

A back key 222 is used to move to a previous screen or item displayed on the broadcast receiving apparatus 100. A menu key 224 is used to display a menu set for the broadcast receiving apparatus 100. A pointer key 225 is used to display a pointer on the broadcast receiving apparatus 100.

A volume key 230 is used for volume control, and a channel key 240 is used for channel selection.

A 3D key 235 may be used to convert a two-dimensional (2D) image displayed on the broadcast receiving apparatus 100, into a 3D image, or to display a list of 3D images displayable on the broadcast receiving apparatus 100.

A PIP key 241 is a key for displaying a plurality of images on the broadcast receiving apparatus 100. Due to operation of the PIP key 241, a plurality of images may be displayed on the display 180 in the form of picture in picture (PIP). Alternatively, a plurality of images may be displayed in parallel.

Any one of the plurality of images may be floated to have a variable location. In this case, the PIP images may also be referred to as dynamic screen images.

In addition, a pointer key for displaying a pointer, a guide key for displaying a guide, a mute key, a color key, etc. are further illustrated in FIG. 1B.

Referring to FIG. 1C, the second surface 251 (rear surface) of the remote controller 200 may be an opposite surface to the first surface 201 (front surface) of the remote controller 200. Character keys 260 and a display 270 may be disposed on the second surface 251 (rear surface) of the remote controller 200.

The character keys 260 may include number keys 262 and alphabet keys 264. In addition, the character keys 260 may further include various keys such as an enter key, function keys, and a spacebar key.

The display 270 may display text input using the character keys 260.

When the character keys 260 are input, the remote controller 200 transmits text information input using the character keys 260, to the broadcast receiving apparatus 100.

Alternatively, the remote controller 200 may transmit coordinate information corresponding to motion of the remote controller 200, to the broadcast receiving apparatus 100. As such, a pointer corresponding to the motion of the remote controller 200 may be displayed on the display 180 of the broadcast receiving apparatus 100. Since the pointer moves according to the motion of the remote controller 200 in a 3D space as described above, the remote controller 200 may be referred to as a 3D pointing device.

FIG. 2 is a block diagram of the broadcast receiving apparatus 100 of FIG. 1A.

Referring to FIG. 2, the broadcast receiving apparatus 100 includes a broadcast receiver 105, a network interface 130, an external device interface 135, a memory 140, a user input interface 150, a controller 170, a display 180, an audio output unit 185, a power supply 190, and a camera 195. The broadcast receiver 105 may include a tuner 110 and a demodulator 120. The broadcast receiver 105 may further include a network interface 130.

The tuner 110 selects a radio frequency (RF) broadcast signal corresponding to a user-selected channel or a pre-stored channel among RF broadcast signals received via an antenna. Furthermore, the tuner 110 converts the selected RF broadcast signal into an intermediate frequency (IF) signal or a baseband audio/video (A/V) signal.

For example, if the selected RF broadcast signal is a digital broadcast signal, the tuner 110 converts the selected RF broadcast signal into a digital IF signal DIF. Otherwise, if the selected RF broadcast signal is an analog broadcast signal, the tuner 110 converts the selected RF broadcast signal into an analog baseband A/V signal CVBS/SIF.

The tuner 110 may sequentially select RF broadcast signals corresponding to all broadcast channels stored using a channel memory function, among the RF broadcast signals received via the antenna, and convert the selected RF broadcast signals into IF signals or baseband A/V signals.

The demodulator 120 receives the digital IF signal DIF converted by the tuner 110, and demodulates the digital IF signal DIF.

The demodulator 120 may perform demodulation and channel decoding and then output a stream signal TS. In this case, the stream signal TS may be a signal in which video, audio, and data signals are multiplexed.

The stream signal TS output from the demodulator 120 may be input to the controller 170. The controller 170 may perform demultiplexing, A/V signal processing, etc. and output video and audio signals respectively to the display 180 and the audio output unit 185.

The external device interface 135 may connect an external device and the broadcast receiving apparatus 100. To this end, the external device interface 135 may include an A/V input/output (I/O) unit (not shown).

The external device interface 135 may be connected to an external device such as a digital versatile disk (DVD) player, a Blu-ray player, a game console, a camera, a camcorder, a computer (e.g., a laptop computer), a set-top box, etc. wirelessly or by wire. The external device interface 135 may transmit signals to or receive signals from the external device.

In order to allow input of A/V signals from the external device to the broadcast receiving apparatus 100, the A/V I/O unit of the external device interface 135 may include a universal serial bus (USB) port, a composite video banking sync (CUBS) port, a component port, an S-video port (analog), a digital visual interface (DVI) port, a high definition multimedia interface (HDMI) port, a Red, Green, Blue (RGB) port, a D-subminiature (D-SUB) port, etc.

In addition, the external device interface 135 may be connected to various set-top boxes via at least one of the above-described ports to transmit signals to or receive signals from the set-top boxes.

The network interface 130 serves as an interface for connecting the broadcast receiving apparatus 100 and a wired/wireless network such as the Internet. For example, the network interface 130 may receive content or data from the Internet, a content provider, or a network operator over a network.

The network interface 130 may be connected to a certain web page over a connected network or another network linked to the connected network. That is, the network interface 130 may be connected to a certain web page over a network and transmit data to or receive data from a corresponding server. In addition, the network interface 130 may receive content or data from a content provider or a network operator.

Furthermore, the network interface 130 may selectively receive a desired application among applications open to the public via a network.

The network interface 130 may include a wired communication unit (not shown) and a radio communication unit (not shown).

The radio communication unit of the network interface 130 may perform short-range wireless communication with other electronic devices. The broadcast receiving apparatus 100 may be connected to another electronic device over a network according to communication standards such as Bluetooth, Radio Frequency Identification (RFID), Infrared Data Association (IrDA), Ultra WideBand (UWB), ZigBee, Digital Living Network Alliance (DLNA), Near Field Communication (NFC), etc.

The memory 140 may store programs necessary for the controller 170 to process and control signals, and also store processed video, audio, and data signals.

The memory 140 may temporarily store video, audio, and data signals input through the external device interface 135 or the network interface 130. Furthermore, the memory 140 may store information about certain broadcast channels using a channel memory function.

In addition, the memory 140 may store an application or an application list input through the external device interface 135 or the network interface 130.

The broadcast receiving apparatus 100 may reproduce and provide a content file (e.g. a video file, a still image file, a music file, a document file, an application file, etc.) to a user.

Although the memory 140 is separated from the controller 170 in FIG. 2, the present invention is not limited thereto and the memory 140 may be included in the controller 170.

The user input interface 150 transmits a signal input by the user, to the controller 170, or transmits a signal received from the controller 170, to the user.

For example, the user input interface 150 may receive a user input signal such as a power on/off signal, a channel selection signal, or a screen setting signal from the remote controller 200, transmit a user input signal input using a local key (not shown) such as a power key, a channel key, a volume key, or a setting key to the controller 170, transmit a user input signal input using a sensor unit (not shown) for sensing a user gesture, to the controller 170, or transmit a signal received from the controller 170, to the sensor unit.

The controller 170 may demultiplex the stream signal TS input from the tuner 110, the demodulator 120, or the external device interface 135, and generates and output A/V signals by processing the demultiplexed signals.

The video signal processed by the controller 170 may be input to the display 180 and displayed as an image corresponding to the video signal. The video signal processed by the controller 170 may also be transmitted to an external output device through the external device interface 135.

The audio signal processed by the controller 170 may be output to the audio output unit 185. The audio signal processed by the controller 170 may also be transmitted to the external output device through the external device interface 135.

Although not shown in FIG. 2, the controller 170 may include a demultiplexer and a video processor. Descriptions thereof will be provided below with reference to FIG. 3.

In addition, the controller 170 may provide overall control to the broadcast receiving apparatus 100. For example, the controller 170 may control the tuner 110 to select (tune to) an RF broadcast signal corresponding to a user-selected channel or a pre-stored channel.

The controller 170 may control the broadcast receiving apparatus 100 according to a user command input through the user input interface 150 or according to an internal program. Particularly, the controller 170 may be connected to a network and download a user-desired application or application list into the broadcast receiving apparatus 100.

For example, the controller 170 controls the tuner 110 to receive a signal of a channel selected according to a certain channel selection command received through the user input interface 150. Then, the controller 170 processes a video, audio, or data signal of the selected channel. The controller 170 outputs information about the user-selected channel together with the processed A/V signal to the display 180 or the audio output unit 185.

As another example, the controller 170 outputs a video or audio signal received through the external device interface 135 from an external device, for example, a camera or a camcorder, to the display 180 or the audio output unit 185, according to an external device image play command received through the user input interface 150.

The controller 170 may control the display 180 to display an image. In this case, the image displayed on the display 180 may be a 2D or 3D still image or video.

The controller 170 may control a certain 2D object in the image displayed on the display 180, to be rendered as a 3D object. For example, the object may be at least one of a connected web page (e.g. a newspaper, a magazine, etc.), an electronic program guide (EPG), a menu, a widget, an icon, a still image, a video, and text.

The controller 170 may recognize the location of the user based on an image captured by an image capturing unit (not shown). For example, the controller 170 may measure the distance (a z-axis coordinate) between the user and the broadcast receiving apparatus 100. In addition, the controller 170 may calculate x-axis and y-axis coordinates corresponding to the location of the user on the display 180.

When an application view item is selected, the controller 170 may control display of an application or application list which is available in the broadcast receiving apparatus 100 or can be downloaded from an external network.

The controller 170 may control installation and execution of applications downloaded from the external network, in conjunction with various user interfaces. The controller 170 may also control display of an image related to an executed application, on the display 180 according to selection of the user.

The controller 170 may receive a user image captured by the camera 195. Then, the controller 170 may recognize a user based on the captured user image, and control the recognized user to log in the broadcast receiving apparatus 100. The controller 170 may provide service according to the logged-in user.

Alternatively, the controller 170 may recognize a gesture of the user based on the user image captured by the camera 195. Particularly, the controller 170 may recognize a face and hand(s) of the user based on the captured user image, and determine whether the face and hand(s) make a specific gesture.

The display 180 generates a drive signal by converting a processed video signal, a processed data signal, and an on screen display (OSD) signal received from the controller 170, or a video signal and a data signal received through the external device interface 135, into an RGB signal.

The display 180 may be a plasma display panel (PDP), a liquid crystal display (LCD), an organic light-emitting diode (OLED), or a flexible display. The display 180 may also be a 3D display.

The display 180 may be formed as a touch screen and thus used as not only an output device but also an input device.

The audio output unit 185 receives a processed audio signal from the controller 170 and outputs the received audio signal as sound.

The power supply 190 supplies power to the broadcast receiving apparatus 100. Particularly, the power supply 190 may supply power to the controller 170 which can be implemented as a system on chip (SOC), the display 180 for displaying an image, and the audio output unit 185 for outputting sound.

To this end, the power supply 190 may include a converter (not shown) for converting alternating current (AC) power into direct current (DC) power. For example, if the display 180 is formed as a liquid crystal panel having a plurality of backlight lamps, the power supply 190 may further include an inverter (not shown) capable of performing pulse width modulation (PWM) for luminance change or dimming driving.

The camera 195 may capture an image of the user and transmit the captured image to the controller 170 of the broadcast receiving apparatus 100. Although one camera 195 is illustrated in FIG. 1A, a plurality of cameras may be used. The camera 195 may be a 2D camera or a 3D camera.

The remote controller 200 transmits user input to the user input interface 150. To this end, the remote controller 200 may use communication standards such as RF, IR, Bluetooth, UWB, ZigBee, etc.

In addition, the remote controller 200 may receive a video, audio, or data signal from the user input interface 150 and output the received signal as an image, sound, or vibration.

The block diagram of the broadcast receiving apparatus 100 illustrated in FIG. 2 is an embodiment of the present invention. Depending upon the specifications of the broadcast receiving apparatus 100 in actual implementation, the broadcast receiving apparatus 100 may include fewer components or more components than those illustrated in FIG. 2. That is, two or more components of the broadcast receiving apparatus 100 may be combined into a single component or a single component thereof may be separated into two or more components. The functions of the components are provided only to describe embodiments of the present invention and do not limit the scope of the invention.

The broadcast receiving apparatus 100 may receive a broadcast image through the network interface 130 or the external device interface 135 and reproduce the broadcast image, without using the tuner 110 and the demodulator 120 illustrated in FIG. 2.

Figure 3:
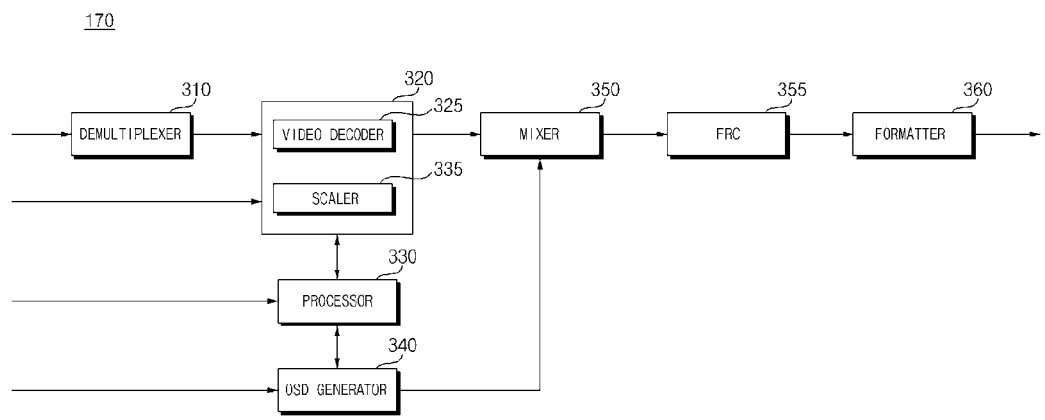
FIG. 3 is a block diagram of the controller of FIG. 2.

FIG. 3 is a block diagram of the controller 170 of FIG. 2.

Referring to FIG. 3, the controller 170 may include a demultiplexer 310, a video processor 320, a processor 330, an OSD generator 340, a mixer 350, a frame rate converter (FRC) 355, and a formatter 360. The controller 170 may further include an audio processor (not shown) and a data processor (not shown).

The demultiplexer 310 demultiplexes an input stream. For example, the demultiplexer 310 may demultiplex an MPEG-2 TS into video, audio, and data signals. Here, the stream signal input to the demultiplexer 310 may be received from the tuner 110, the demodulator 120, or the external device interface 135.

The video processor 320 may process the demultiplexed video signal. To this end, the video processor 320 may include a video decoder 325 and a scaler 335.

The video decoder 325 decodes the demultiplexed video signal, and the scaler 335 scales the resolution of the decoded video signal in such a manner that the video signal is displayable on the display 180.

The video decoder 325 may operate based on various standards.

The video signal decoded by the video processor 320 is input to the mixer 350.

The processor 330 may provide overall control to the broadcast receiving apparatus 100 or the controller 170. For example, the processor 330 may control the tuner 110 to tune to an RF broadcast signal corresponding to a user-selected channel or a pre-stored channel.

The processor 330 may control the broadcast receiving apparatus 100 according to a user command received through the user input interface 150 or according to an internal program.

The processor 330 may control data transmission through the network interface 130 or the external device interface 135.

The processor 330 may control operations of the demultiplexer 310, the video processor 320, and the OSD generator 340 of the controller 170.

The OSD generator 340 generates an OSD signal autonomously or according to user input. For example, the OSD generator 340 may generate a signal for displaying various types of information as graphic or text on a screen of the display 180, according to a user input signal or a control signal. The generated OSD signal may include various types of data, for example, a user interface screen, menu screens, widgets, icons, etc.

For example, the OSD generator 340 may generate a signal for displaying captions of a broadcast image, or broadcast information based on an EPG.

Since the OSD generator 340 generates an OSD signal or a graphic signal, the OSD generator 340 may be referred to as a graphic processor.

The mixer 350 may mix the OSD signal generated by the OSD generator 340 with the decoded video signal processed by the video processor 220. The mixed signal is provided to the formatter 360. Since a decoded broadcast image signal or an external input signal is mixed with an OSD signal, the OSD may be overlapped with the broadcast image or the external input image.

The FRC 355 may change the frame rate of an input image. Alternatively, the FRC 355 may not change but constantly maintain the frame rate of the input image.

The formatter 360 changes the format of the signal output from the FRC 355 to be suitable for the display 180. For example, the formatter 360 may convert a received signal into an RGB data signal. The RGB data signal may be output as a low voltage differential signal (LVDS) or a mini-LVDS.

The formatter 360 may change the format of a 3D video signal or convert a 2D image into a 3D image.

The audio processor (not shown) of the controller 170 may process the demultiplexed audio signal. To this end, the audio processor may include a variety of decoders.

The audio processor of the controller 170 may control the bass, treble or volume of the audio signal.

The data processor (not shown) of the controller 170 may process the demultiplexed data signal. For example, if the demultiplexed data signal is a coded data signal, the data processor may decode the data signal. The coded data signal may be EPG information including broadcast information indicating the start time, end time, etc. of broadcast programs of each channel.

The block diagram of the controller 170 illustrated in FIG. 3 is an embodiment of the present invention. Depending upon the specifications of the controller 170 in actual implementation, the controller 170 may include fewer components or more components than those illustrated in FIG. 3.

Particularly, the FRC 355 and the formatter 360 may be separated from the controller 170.

Figure 4:
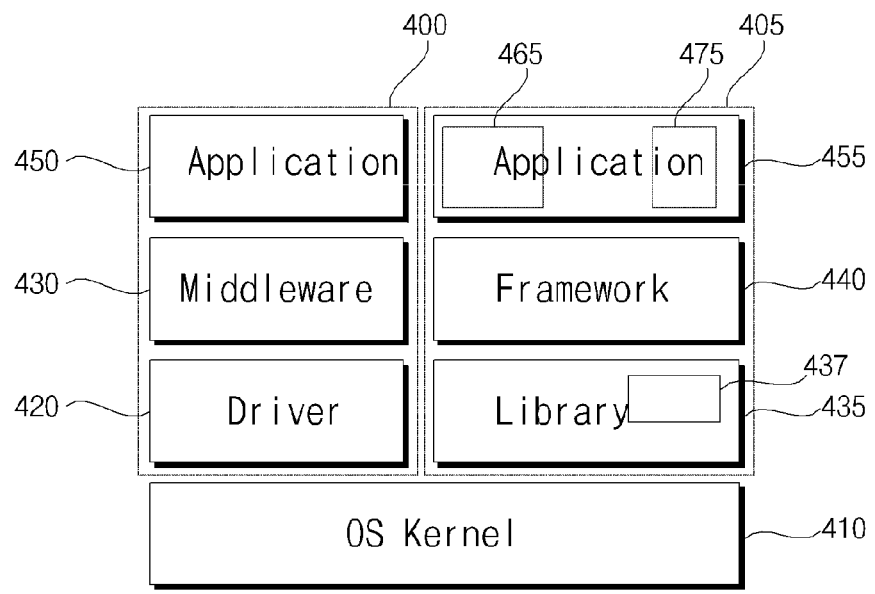
FIGS. 4 and 5 are diagrams illustrating exemplary smart platform architectures for the broadcast receiving apparatus of FIG. 2.
Figure 5:
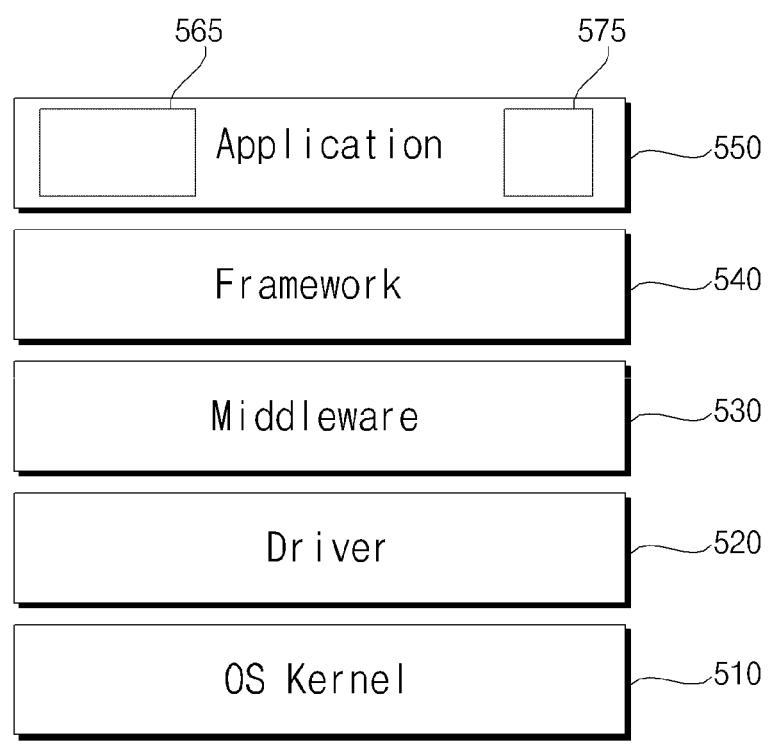

FIGS. 4 and 5 are diagrams illustrating various examples of the platform architecture for the broadcast receiving apparatus 100 of FIG. 2.

A platform for the broadcast receiving apparatus 100 may have OS-based software to implement the above-described various operations.

Referring to FIG. 4, a platform for the broadcast receiving apparatus 100 according to an embodiment of the present invention may be a separate type and designed to separate a legacy system platform 400 and a smart system platform 405. An OS kernel 410 may be used commonly by the legacy system platform 400 and the smart system platform 405.

The legacy system platform 400 may include a driver 420, middleware 430, and an application layer 450 on the OS kernel 410, and the smart system platform 405 may include a library 435, a framework 440, and an application layer 455 on the OS kernel 410.

The OS kernel 410 is the core of an OS. When the broadcast receiving apparatus 100 is driven, the OS kernel 410 may perform at least one of driving of hardware drivers, security protection for hardware and processors in the broadcast receiving apparatus 100, efficient management of system resources, memory management, hardware interfacing by hardware abstraction, multi-processing, and scheduling associated with the multi-processing. The OS kernel 410 may further perform power management, etc.

The hardware drivers of the OS kernel 410 may include, for example, at least one of a display driver, a Wireless Fidelity (Wi-Fi) driver, a Bluetooth driver, a USB driver, an audio driver, a power manager, a binder driver, and a memory driver.

Furthermore, the hardware drivers of the OS kernel 410 may be drivers for hardware devices in the OS kernel 410, and include a character device driver, a block device driver, and a network device driver. The block device driver may need a buffer for buffering as much data as a unit size because data is transmitted in block units. The character device driver may not need a buffer because data is transmitted in basic data units, that is, in character units.

The OS kernel 410 may be implemented based on various OSs such as Unix (Linux), Windows, etc. The OS kernel 410 may be a general-purpose open OS kernel which is usable in other electronic devices.

The driver 420 is located between the OS kernel 410 and the middleware 430, and drives devices in conjunction with the middleware 430 for operation of the application layer 450. For example, the driver 420 may include drivers for a microcomputer (micom), a display module, a graphic processing unit (GPU), a frame rate converter (FRC), a general-purpose input/output (GPIO) pin, a high-definition multimedia interface (HDMI), a system decoder (or demultiplexer) (SDEC), a video decoder (VDEC), an audio decoder (ADEC), a personal video recorder (PVR), an inter-integrated circuit (I2C), etc. These drivers operate in conjunction with the hardware drivers of the OS kernel 410.

In addition, the driver 420 may further include a driver for the remote controller 200 and, more particularly, a 3D pointing device to be described below. The 3D pointing device driver may be included in the OS kernel 410 or the middleware 430, instead of the driver 420.

The middleware 430 may be located between the OS kernel 410 and the application layer 450, and mediate data transmission and reception between different hardware devices or different software programs. As such, the middleware 430 may provide standard interfaces, support various environments, and enable interaction between tasks with different systems.

Examples of the middleware 430 of the legacy system platform 400 may include Multimedia and Hypermedia information coding Experts Group (MHEG) and Advanced Common Application Platform (ACAP) middleware related to data broadcasting, Program and System Information Protocol (PSIP) or System Information (SI) middleware related to broadcast information, Digital Living Network Alliance (DLNA) middleware related to peripheral device communication, etc.

The application layer 450 on the middleware 430 in the legacy system platform 400 may include, for example, user interface (UI) applications related to various menus of the broadcast receiving apparatus 100. The application layer 450 on the middleware 430 may be edited according to user selection over a network. Using the application layer 450, a user may enter a desired menu among various UIs by manipulating the remote controller 210 while viewing a broadcast image.

The application layer 450 of the legacy system platform 400 may further include at least one of a TV guide application, a Bluetooth application, a reservation application, a digital video recorder (DVR) application, and a hotkey application.

In the smart system platform 405, the library 435 may be located between the OS kernel 410 and the framework 440, and form the basis of the framework 440. For example, the library 435 may include secure socket layer (SSL) as a library related to security, WebKit as a library related to web engines, c library (libc), media framework as a library related to media, for example, a video format and an audio format, etc. The library 435 may be written in C or C++. Also, the library 435 may be exposed to a developer through the framework 440.

The library 435 may include a runtime 437 having a core Java library and a virtual machine (VM). The runtime 437 forms the basis of the framework 440 in conjunction with the library 435.

The VM may be a virtual machine for allowing concurrent execution of a plurality of instances, that is, multi-tasking. For each application of the application layer 455, a VM may be allocated and executed. In this case, for scheduling or interconnection between the instances, a binder driver (not shown) of the OS kernel 410 may operate.

The binder driver and the runtime 437 may connect Java-based applications and C-based libraries.

The library 435 and the runtime 437 may correspond to the middleware 430 of the legacy system platform 400.

The framework 440 of the smart system platform 405 includes programs on which applications of the application layer 455 are based. The framework 440 is compatible with any application and may allow reuse, movement, or exchange of components. The framework 440 may include supporting programs, programs for interconnecting different software components, etc. For example, the framework 440 may include a resource manager, an activity manager related to activities of the applications, a notification manager, a content provider for abstracting shared information among the applications, etc. The framework 440 may be written in Java.

The application layer 455 on the framework 440 includes a variety of programs which are executable in and displayable on the broadcast receiving apparatus 100. For example, the application layer 455 may include a core application having at least one of e-mail, short message service (SMS), calendar, map, and browser. The application layer 455 may be written in Java.

The applications of the application layer 455 may be categorized into user-undeletable applications 465 stored in the broadcast receiving apparatus 100, and user-installable or user-deletable applications 475 downloaded from an external device or a network and stored in the broadcast receiving apparatus 100.

Using the applications of the application layer 455, Internet phone service, video on demand (VOD) service, web album service, social networking service (SNS), location-based service (LBS), map service, web browsing service, application search service, etc. may be performed through network access. In addition, various functions such as gaming and scheduling may be performed by the applications.

Referring to FIG. 5, a platform for the broadcast receiving apparatus 100 according to another embodiment of the present invention may be an integrated type and include an OS kernel 510, a driver 520, middleware 530, a framework 540, and an application layer 550.

The integrated-type platform of FIG. 5 is different from the separate-type platform of FIG. 4 in that the library 435 is not provided and the application layer 550 is formed as an integrated layer. The driver 520 and the framework 540 correspond to the driver 420 and the framework 440 of FIG. 4, respectively.

The library 435 of FIG. 4 may be integrated into the middleware 530. That is, the middleware 530 may include both legacy system middleware and broadcast receiver system middleware. As described before, the legacy system middleware may include MHEG or ACAP middleware related to data broadcasting, PSIP or SI middleware related to broadcast information, DLNA middleware related to peripheral device communication, etc., and the broadcast receiver system middleware may include SSL as a library related to security, WebKit as a library related to web engines, libc, media framework as a library related to media, etc. The middleware 530 may further include the above-described runtime.

The application layer 550 may include a menu-related application, a TV guide application, a reservation application, etc. as legacy system applications, and e-mail, SMS, calendar, map, browser, etc. as broadcast receiver system applications.

The applications of the application layer 550 may be categorized into user-undeletable applications 565 stored in the broadcast receiving apparatus 100, and user-installable or user-deletable applications 575 downloaded from an external device or a network and stored in the broadcast receiving apparatus 100.

The above-described platforms of FIGS. 4 and 5 may be used for general purposes in various electronic devices as well as the broadcast receiving apparatus 100.

The platforms of FIGS. 4 and 5 may be loaded in the memory 140, the controller 170, or a separate processor (not shown).

Figure 6A:
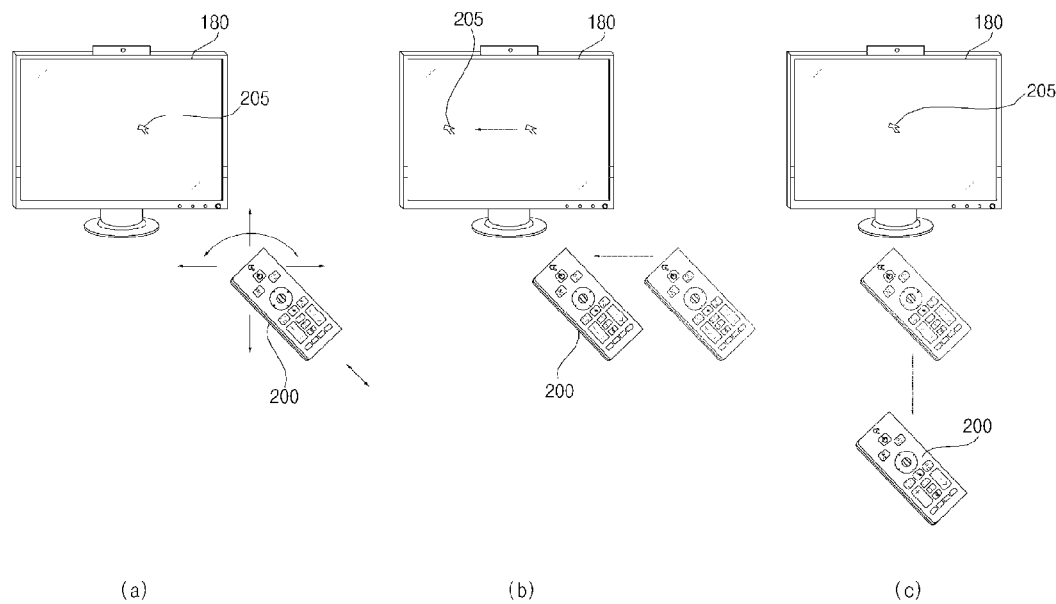
FIG. 6A is a diagram illustrating an operation method using the first surface of the remote controller of FIG. 1B.

FIG. 6A is a diagram illustrating an operation method using the first surface 201 of the remote controller 200 of FIG. 1B.

Referring to FIG. 6A, while the first surface 201 of the remote controller 200 faces upward, a pointer 205 is displayed to correspond to motion of the remote controller 200.

FIG. 6A(a) illustrates that the pointer 205 corresponding to the remote controller 200 is displayed at a certain location of the display 180.

A user may move the remote controller 200 horizontally and vertically (FIG. 6A(b)), and back and forth (FIG. 6A(c)), or rotate the remote controller 200. The pointer 205 displayed on the display 180 of the broadcast receiving apparatus 100 moves to correspond to motion of the remote controller 200. Since the pointer 205 moves according to the motion of the remote controller 200 in a 3D space as illustrated in FIG. 6A, the remote controller 200 may be referred to as a space remote controller or a 3D pointing device.

FIG. 6A(b) illustrates that, when the user moves the remote controller 200 leftward, the pointer 205 displayed on the display 180 of the broadcast receiving apparatus 100 correspondingly moves leftward.

Information about motion of the remote controller 200 sensed by a sensor of the remote controller 200 is transmitted to the broadcast receiving apparatus 100. The broadcast receiving apparatus 100 may calculate a coordinate of the pointer 205 based on the information about motion of the remote controller 200. The broadcast receiving apparatus 100 may display the pointer 205 to correspond to the calculated coordinate.

FIG. 6A(c) illustrates that, while a certain button of the remote controller 200 is being pressed, a user moves the remote controller 200 away from the display 180. As such, a selected area of the display 180 corresponding to the pointer 205 may be zoomed in and enlarged. On the contrary, when the user moves the remote controller 200 toward the display 180, the selected area of the display 180 corresponding to the pointer 205 may be zoomed out and reduced in size. Otherwise, when the remote controller 200 moves away from the display 180, the selected area may be zoomed out and, when the remote controller 200 moves toward the display 180, the selected area may be zoomed in.

Alternatively, while the certain button of the remote controller 200 is being pressed, horizontal or vertical motion of the remote controller 200 may be ignored. That is, when the remote controller 200 moves away from or toward the display 180, only back and forth motion of the remote controller 200 may be sensed and horizontal or vertical motion of the remote controller 200 may be ignored. When the certain button of the remote controller 200 is not pressed, only the pointer 205 moves according to horizontal or vertical motion of the remote controller 200.

The speed and direction of the pointer 205 may correspond to the speed and direction of the remote controller 200.

Figure 6B:
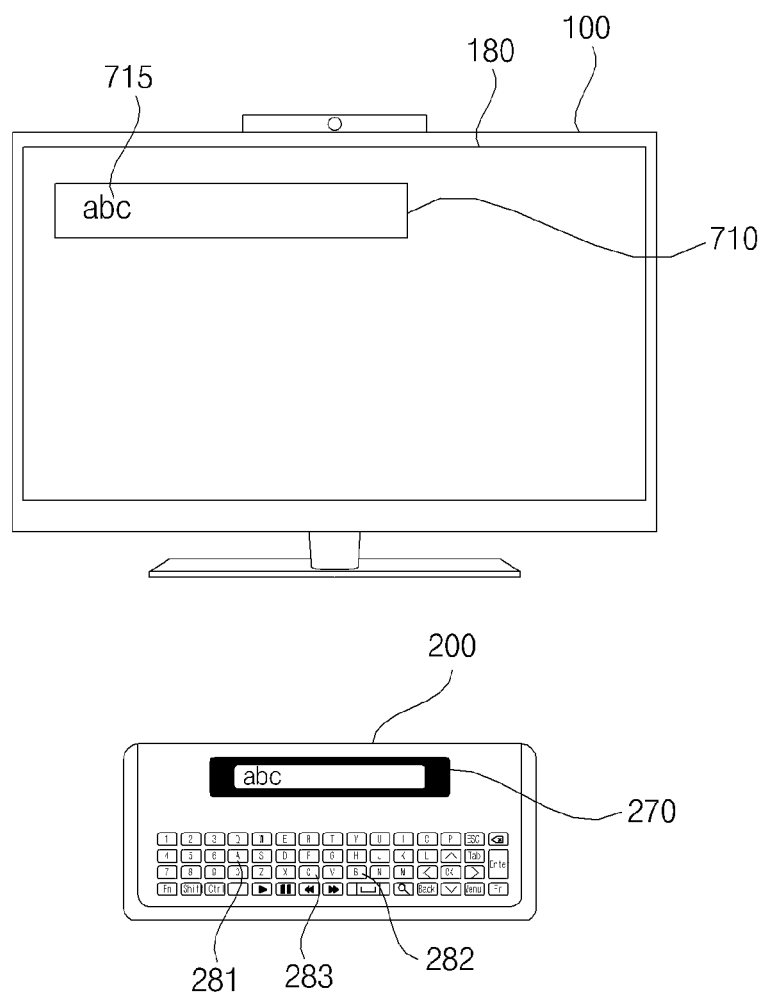
FIG. 6B is a diagram illustrating an operation method using the second surface of the remote controller of FIG. 1C.

FIG. 6B is a diagram illustrating an operation method using the second surface 251 of the remote controller 200 of FIG. 1C;

Referring to FIG. 6B, the second surface 251 of the remote controller 200 faces upward, the first surface 201 faces downward, and character keys of the remote controller 200 are input.

For example, if a first alphabet key 281, a second alphabet key 282, and a third alphabet key 282 among the character keys are sequentially input, the remote controller 200 transmits corresponding key information to the broadcast receiving apparatus 100. As such, the broadcast receiving apparatus 100 may display corresponding text "abc" 715 on a display window 710.

The characters "abc" may be correspondingly displayed on the display 270 of the remote controller 200.

Figure 7:
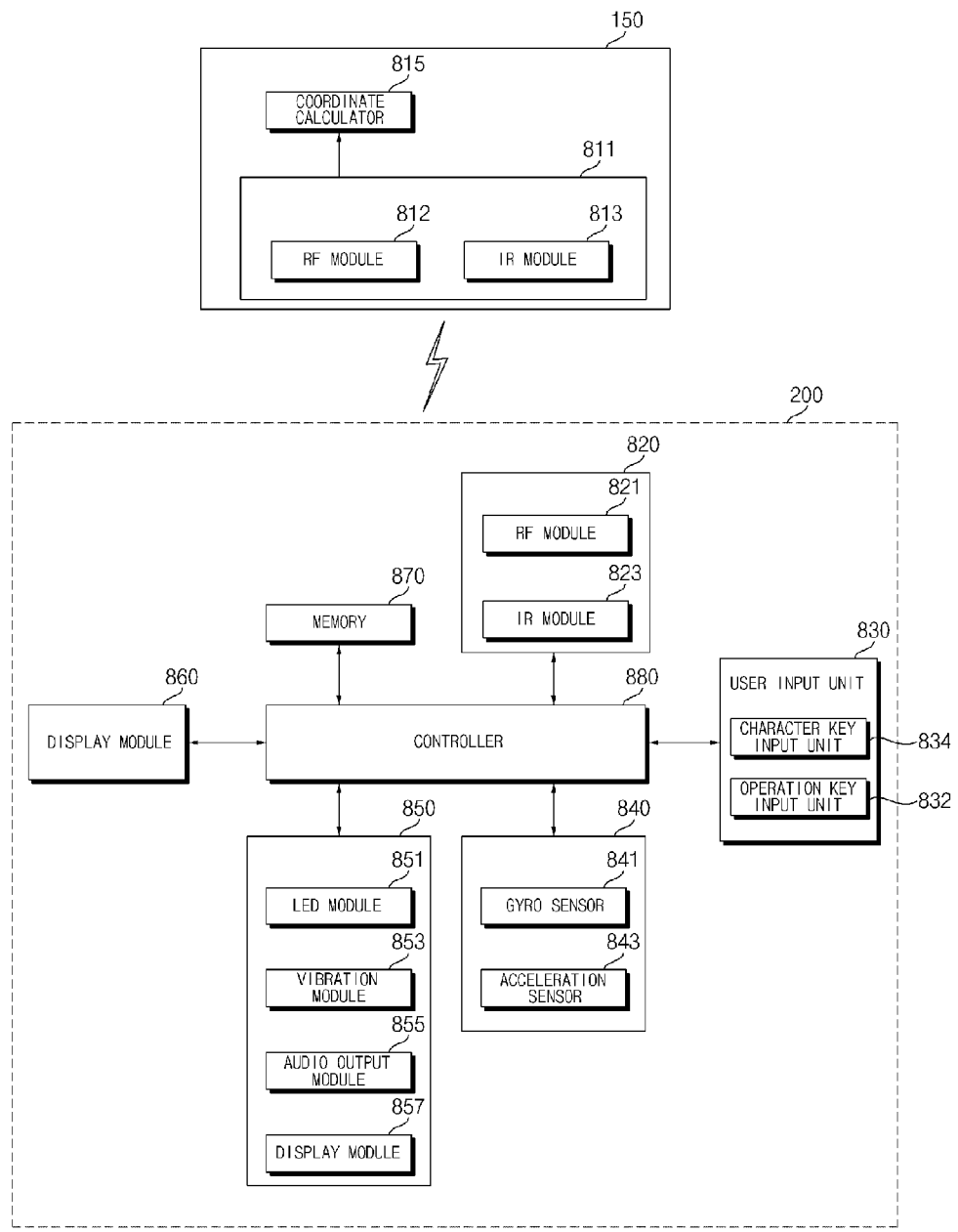
FIG. 7 is a block diagram of the remote controller of FIG. 1A.

FIG. 7 is a block diagram of the remote controller 200 of FIG. 1A.

Referring to FIG. 7, the remote controller 200 may include a radio communication unit 820, a user input unit 830, a sensor unit 840, an output unit 850, a power supply 860, a memory 870, and a controller 880.

The radio communication unit 820 transmits and receives signals to and from any one of the broadcast receiving apparatuses according to the embodiments of the present invention. Among the broadcast receiving apparatuses according to the embodiments of the present invention, for example, one broadcast receiving apparatus 100 will be described.

In the current embodiment, the radio communication unit 820 may include an RF module 821 for transmitting and receiving signals to and from the broadcast receiving apparatus 100 according to the RF communication standard. The radio communication unit 820 may further include an IR module 823 for transmitting and receiving signals to and from the broadcast receiving apparatus 100 according to the IR communication standard.

In the current embodiment, the remote controller 200 may transmit information about motion of the remote controller 200 to the broadcast receiving apparatus 100 through the RF module 821.

The remote controller 200 may receive a signal from the broadcast receiving apparatus 100 through the RF module 821. The remote controller 200 may transmit a command related to power on/off, channel selection, volume control, etc. to the broadcast receiving apparatus 100 through the IR module 823.

In the current embodiment, the user input unit 830 may include an operation key input unit 832 for inputting operation keys, and a character key input unit 834 for inputting character keys.

The operation key input unit 832 may include various operation keys placed on the front surface 201 of the remote controller 200 as described above in relation to FIG. 1B. For example, the operation key input unit 832 may include the power key 202, the home key 204, the search key 206, the four-direction key 210, the wheel key 222, the back key 222, the menu key 224, the volume key 230, the 3D key 235, the channel key 240, etc.

The character key input unit 834 may include various character keys placed on the rear surface 251 of the remote controller 200 as described above in relation to FIG. 1B. For example, the character key input unit 834 may include the number keys 262, the alphabet keys 264, etc.

A user may input a command for remotely controlling the broadcast receiving apparatus 100 by manipulating the user input unit 830. If the user input unit 230 includes hard keys, the user may input a command related to the broadcast receiving apparatus 100 using the remote controller 200 by pushing the hard keys. If the user input unit 230 includes a touchscreen, the user may input a command related to the broadcast receiving apparatus 100 using the remote controller 200 by touching soft keys on the touchscreen. In addition, the user input unit 830 may include a variety of input means to be manipulated by the user, for example, a scroll key, a jog key, etc., and the current embodiment does not limit the scope of the present invention.

The sensor unit 840 may sense and output motion information of the remote controller 200. To this end, the sensor unit 840 may include a gyro sensor 841 or an acceleration sensor 843.

The gyro sensor 841 may sense information about the direction of the remote controller 200. For example, the gyro sensor 841 may sense information about the direction of the remote controller 200 on x, y, and z axes.

The acceleration sensor 843 may sense information about the speed of the remote controller 200. For example, the acceleration sensor 843 may sense information about the speed of the remote controller 200 on x, y, and z axes.

The sensor unit 840 may further include a distance measuring sensor for sensing distance information from the display 180.

The motion information output from the sensor unit 840 may include the information about the direction of the remote controller 200, which is sensed by the gyro sensor 841, and the information about the speed of the remote controller 200, which is sensed by the acceleration sensor 843, and further include the distance information.

The output unit 850 may output an A/V signal corresponding to manipulation of the user input unit 830 or a signal transmitted from the broadcast receiving apparatus 100. The user may recognize whether the user input unit 830 is manipulated or whether the broadcast receiving apparatus 100 is controlled, based on the A/V signal output from the output unit 850.

For example, the output unit 850 may include a light emitting diode (LED) module 851 for producing light when the user input unit 830 is manipulated or a signal is transmitted to or received from the broadcast receiving apparatus 100 through the radio communication unit 820, a vibration module 853 for generating vibrations, an audio output module 855 for outputting sound, or a display module 857 for displaying an image.

The power supply 860 supplies power to the remote controller 200. If the remote controller 200 does not move for a certain period of time, the power supply 860 may cut off supply of power to the remote controller 200 to save power. The power supply 860 may resume supply of power when a certain key of the remote controller 200 is manipulated.

The memory 870 may store various programs and application data for controlling or operating the remote controller 200. The remote controller 200 may wirelessly transmit and receive signals to and from the broadcast receiving apparatus 100 in a certain frequency band through the RF module 821. The controller 880 of the remote controller 200 may store information about the frequency band used to wirelessly transmit and receive signals between the remote controller 200 and the broadcast receiving apparatus 100 paired to the remote controller 200, in the memory 870 and then refer to this information later.

The controller 880 provides overall control to the remote controller 200.

The controller 880 may transmit key manipulation information of the user input unit 830 or motion information of the remote controller 200 sensed by the sensor unit 840, to the broadcast receiving apparatus 100 through the radio communication unit 820.

The broadcast receiving apparatus 100, more particularly, the user input interface 150 receives the key manipulation information or the motion information. To this end, the user input interface 150 may include a radio communication unit 811.

The radio communication unit 811 may include an RF module 812 for RF communication with the remote controller 200, and an IR module 813 for IR communication with the remote controller 200.

The user input interface 150 may further include a coordinate calculator 815 for calculating a coordinate of a pointer using the motion information of the remote controller 200.

The coordinate of the pointer may be calculated by the controller 170 instead of the coordinate calculator 815. To this end, the user input interface 150 may transfer the motion information of the remote controller 200 to the controller 170.

Figure 8:
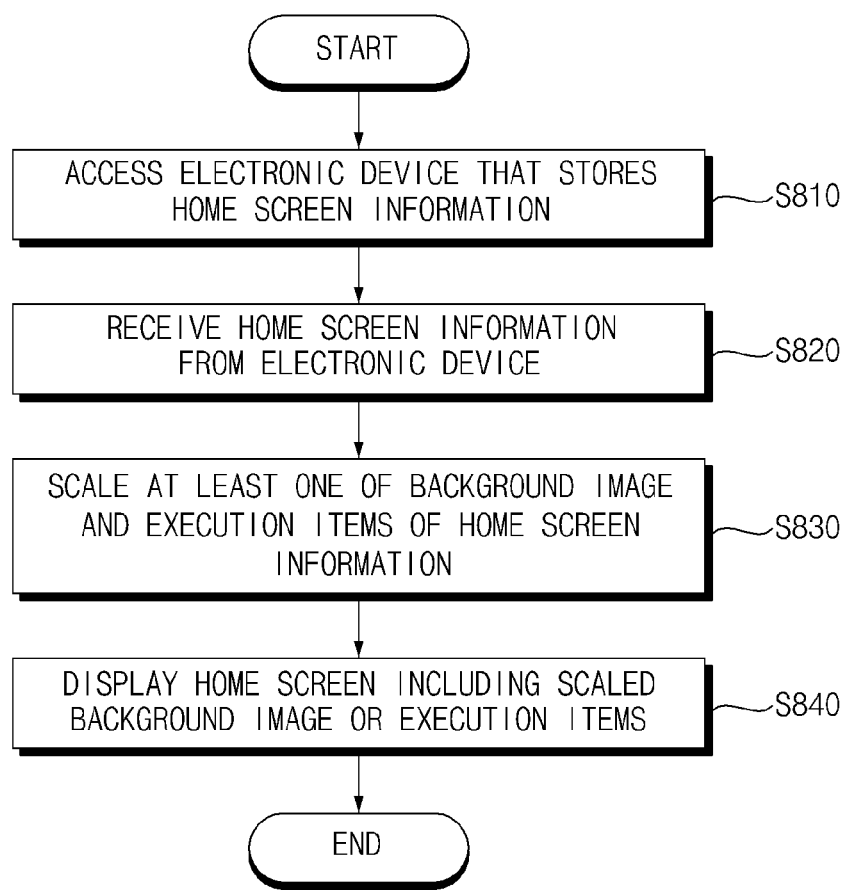
FIG. 8 is a flowchart of a method for operating a broadcast receiving apparatus, according to an embodiment of the present invention.

FIG. 8 is a flowchart of a method for operating the broadcast receiving apparatus 100, according to an embodiment of the present invention, and FIGS. 9 to 17 are diagrams referred to for describing the method of FIG. 8.

Referring to FIG. 8, the broadcast receiving apparatus 100 accesses an electronic device that stores home screen information (S810).

The broadcast receiving apparatus 100 may be connected to the electronic device due to input of an electronic device connection command. Here, the electronic device may be an adjacent mobile device.

For example, FIG. 12(a) illustrates that a mobile device 600c approaches the broadcast receiving apparatus 100 within a certain distance to perform tagging. As such, the broadcast receiving apparatus 100 may be connected to the mobile device 600c through NFC using the network interface 130.

Figure 11A:
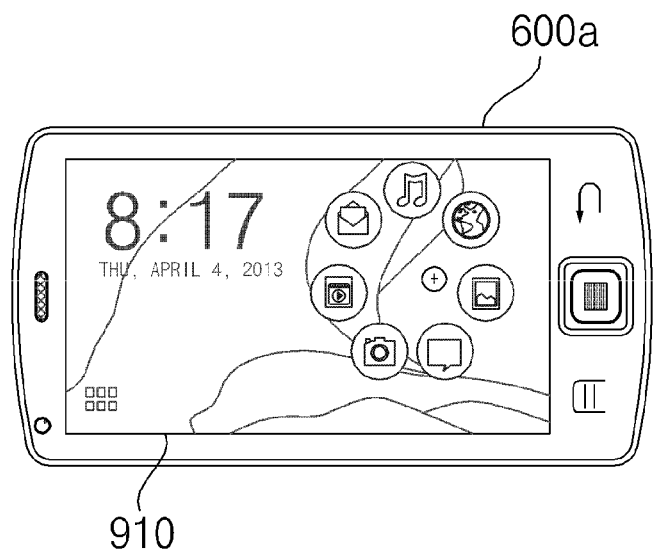
Figure 11B:
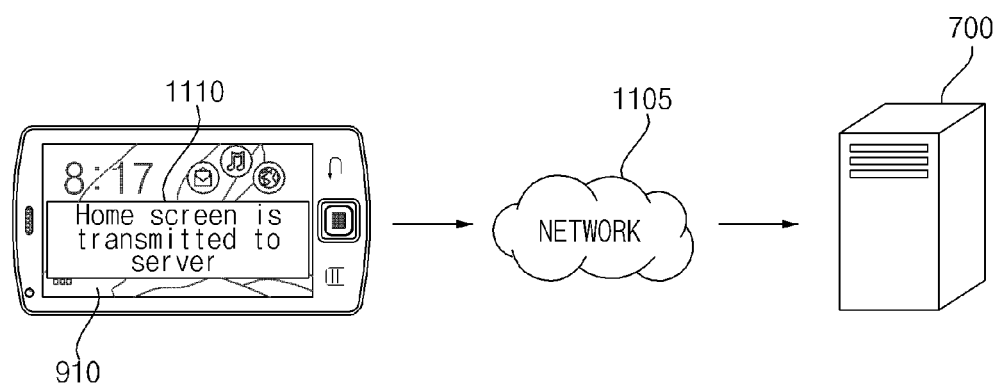
Figure 11C:
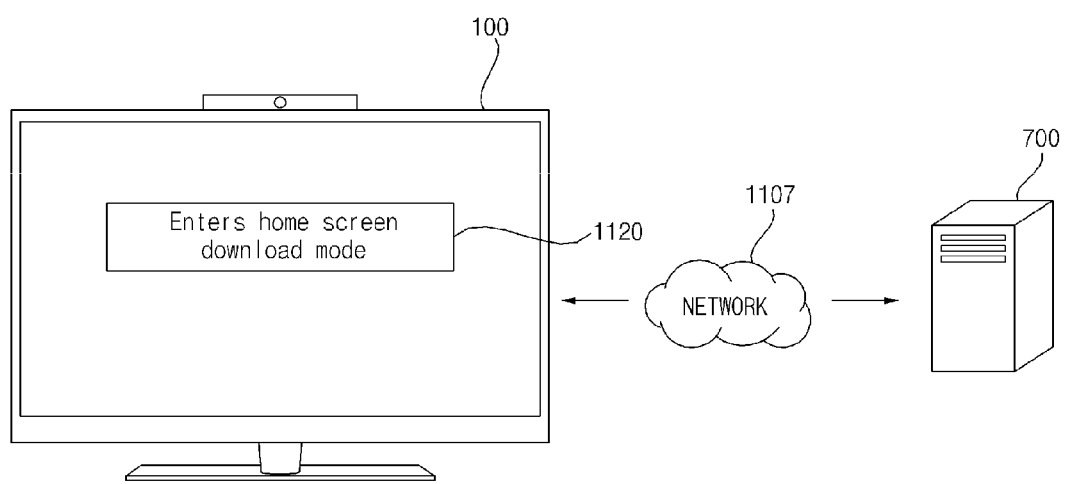

As another example, as illustrated in FIG. 11C, the broadcast receiving apparatus 100 may be connected to a server 700 via a network 1107. For example, when specific user log-in information for the server 700 is input, the broadcast receiving apparatus 100 may be connected to the server 700 through wired or wireless communication using the network interface 130.

The home screen information stored in the electronic device may be home screen information used by the electronic device. Alternatively, home screen information used by another electronic device may be stored in the electronic device connected to the broadcast receiving apparatus 100.

For example, when the mobile device 600c approaches the broadcast receiving apparatus 100 within a certain distance to perform tagging as illustrated in FIG. 12(a), the mobile device 600c may store home screen information for a user of the mobile device 600c.

As another example, when the broadcast receiving apparatus 100 is connected to the server 700 via the network 1107 due to specific user log-in information of the broadcast receiving apparatus 100 as illustrated in FIG. 11C, the server 700 may store home screen information of a mobile device 600a used by a specific user. As will be described below, the server 700 may transmit the home screen information of the mobile device 600a used by the specific user, to the broadcast receiving apparatus 100.

The home screen information may include a background image and a plurality of execution items. For example, FIG. 10(a) illustrates that a main home screen 1010 is displayed on a mobile device 600a as the home screen information. The main home screen 1010 of FIG. 10(a) may include a background image 1011 and a plurality of application items 1012. While the main home screen 1010 is being displayed on the mobile device 600a as illustrated in FIG. 10(a), if a screen switch command is received, screens may be switched and a first sub home screen including another background image and additional application items may be displayed. Then, another sub home screen may be displayed according to user settings and input.

Figure 10:
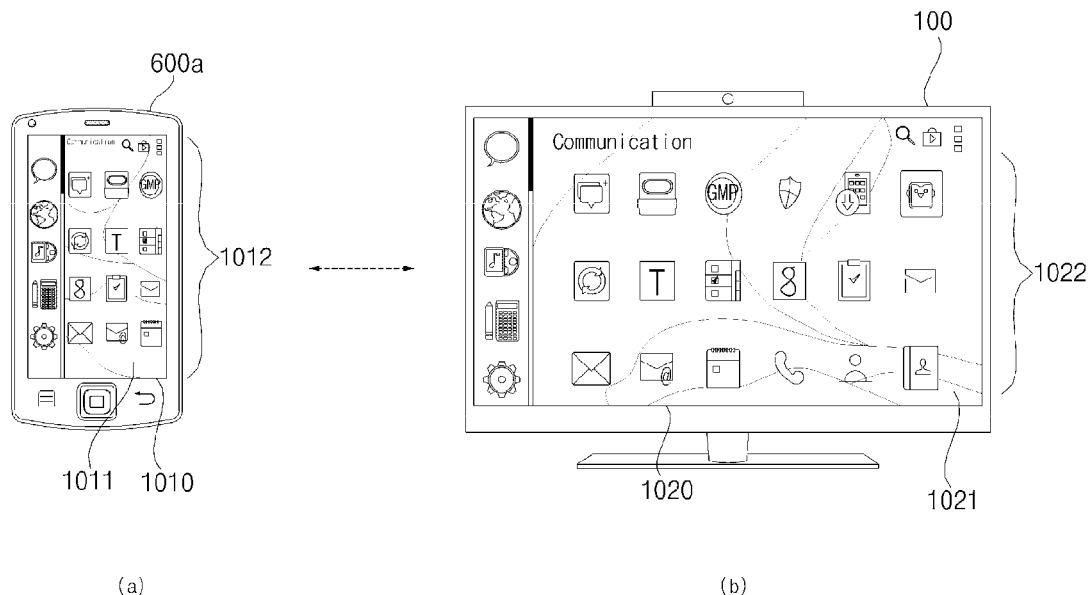

In this specification, the home screen information may include the main home screen 1010 including the background image 1011 and the application items 1012 as illustrated in FIG. 10(*a*), and a sub home screen (not shown) including another background image and additional application items.

Since the home screen information includes a background image and a plurality of execution items, the home screen information may be referred to as home launcher information or home screen launcher information. In the following description, the term 'home screen information' is used for simplicity.

Then, the broadcast receiving apparatus 100 receives the home screen information from the connected electronic device (S820).

Figure 12:
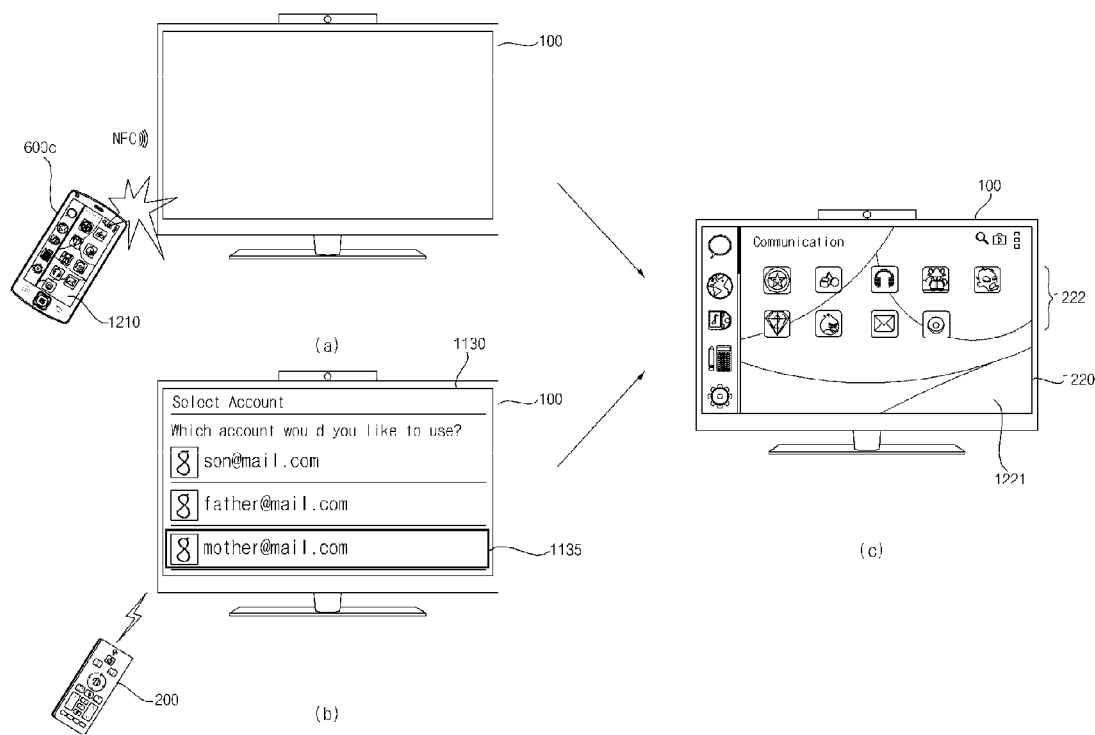

For example, when the mobile device 600c and the broadcast receiving apparatus 100 are connected to each other through NFC as illustrated in FIG. 12(*a*), the network interface 130 of the broadcast receiving apparatus 100 may receive the home screen information of the mobile device 600c using an NFC module.

To receive the home screen information, the mobile device 600c may be in an external transfer mode for transmitting its home screen information outside the mobile device 600c. When the mobile device 600c is in an external transfer mode, the home screen information for the user of the mobile device 600c is stored in an NFC module of the mobile device 600c. When tagging is performed between the mobile device 600c and the broadcast receiving apparatus 100, the network interface 130 of the broadcast receiving apparatus 100 may receive the home screen information of the mobile device 600c through the NFC module.

As another example, when the broadcast receiving apparatus 100 is connected to the server 700 due to the specific user log-in information as illustrated in FIG. 11C, the network interface 130 of the broadcast receiving apparatus 100 may receive the home screen information of the mobile device 600a used by the specific user, which is stored in the server 700.

To receive the home screen information, the mobile device 600a used by the specific user may enter an external transfer mode as illustrated in FIG. 11B. As such, the mobile device 600a used by the specific user may transmit the home screen information of the mobile device 600a to the server 700 via a network 1105. When the broadcast receiving apparatus 100 is connected to the server 700 due to the specific user log-in information as illustrated in FIG. 11C, the broadcast receiving apparatus 100 may receive the home screen information of the mobile device 600a via the network 1107 from the server 700.

Then, the broadcast receiving apparatus 100 scales at least one of the background image and the execution items of the home screen information (S830).

The controller 170 of the broadcast receiving apparatus 100 may scale at least one of the background image and the execution items of the home screen information received through the network interface 130.

For example, when a home screen is received, if information about an electronic device in which the home screen is used, more particularly, screen setting information of the electronic device, is also received, the controller 170 of the broadcast receiving apparatus 100 may scale at least one of the background image and the execution items of the received home screen information in consideration of screen setting information of the broadcast receiving apparatus 100 and the screen setting information of the electronic device. Preferably, the controller 170 may scale both the background image and the execution items.

Here, the screen setting information may include at least one of resolution information, landscape mode/portrait mode information, aspect ratio information, and width and height information.

Scaling of a home screen may include at least one of changing of an aspect ratio of the home screen, switching between a landscape mode and a portrait mode of the home screen, and resizing of a background image, execution item images, or text in the home screen.

The scaling of the home screen may further include scaling of only a part of the background image of the home screen, or scaling of only a few of the execution items of the home screen.

The scaling may be performed optionally according to user input. Furthermore, a part of the home screen may be separated according to user settings and only the separated part may be scaled.

Then, the broadcast receiving apparatus 100 displays a home screen including the scaled background image or execution items (S840).

The controller 170 of the broadcast receiving apparatus 100 controls the display 180 to display the home screen including the scaled background image or execution items.

For example, as illustrated in FIG. 10(*b*), a home screen 1020 scaled from the main home screen 1010 of the mobile device 600b of FIG. 10(*a*) may be displayed on the display 180 of the broadcast receiving apparatus 100.

As such, a home screen used by a specific user may be shared among a plurality of electronic devices and thus user convenience may be improved.

Particularly, since a home screen of a mobile device may be used as a home screen of a broadcast receiving apparatus (e.g., TV), a user may use the broadcast receiving apparatus as if the user uses the mobile device.

If a shared home screen display command is received while a certain image is being displayed, the home screen may be displayed. In this case, if there are a plurality of home screens, a home screen related to the displayed image may be displayed. For example, if a shared home screen display command is received while a sport image is being viewed, a home screen including the sport image or a home screen including an execution item related to sports may be selected and displayed among a plurality of home screens.

Meanwhile, a home screen may be displayed together with a broadcast image. As such, at least one of the broadcast image and the scaled home screen may be displayed translucently.

Alternatively, only a part of the scaled home screen may be displayed. For example, only a part of the scaled home screen may be displayed together with the broadcast image according to user input. As such, the part of the scaled home screen may be checked briefly while viewing the broadcast image.

A detailed description is now given of the method of FIG. 8 with reference to FIGS. 9 to 17.

Figure 9:
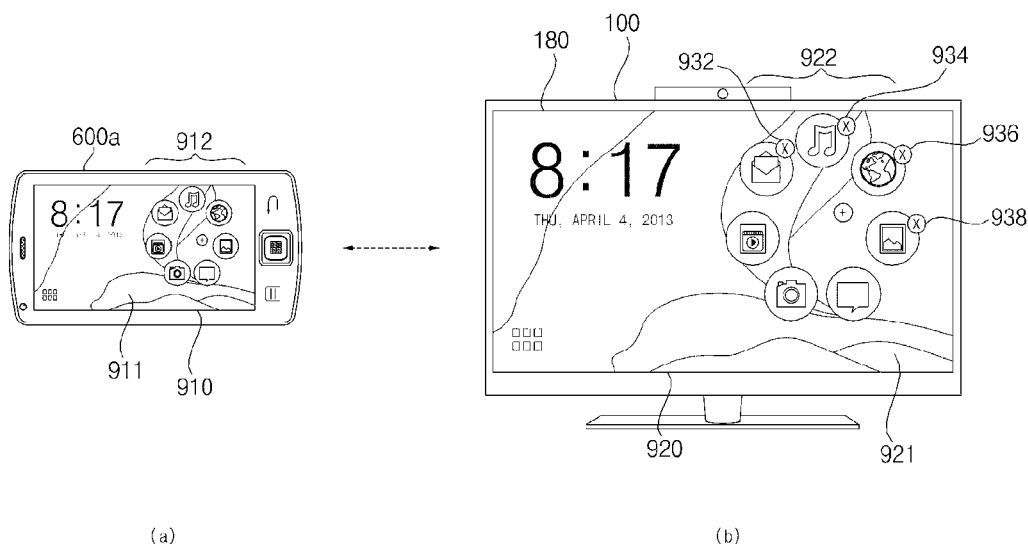
FIGS. 9 to 17 are diagrams referred to for describing the method of FIG. 8.

FIG. 9 illustrates an example of a home screen shared between a mobile device and the broadcast receiving apparatus 100.

FIG. 9(*a*) illustrates a home screen 910 of the first mobile device 600a used by a first user (for example, father). The home screen 910 may include a background image 911 and a plurality of execution items 912. Although not marked with reference numerals in FIG. 9(*a*), the execution items 912 include a folder item, a music item, an Internet item, an image item, a messenger item, a camera item, and a video item. When one of these execution items 912 is selected, a corresponding operation may be performed.

FIG. 9(b) illustrates a home screen 920 of the broadcast receiving apparatus 100 (e.g., TV) used by the first user, which is scaled, for example, enlarged from the home screen 910 of FIG. 9(a).

A home screen may be shared between the first mobile device 600a and the broadcast receiving apparatus 100 through one-to-one data sharing due to, for example, NFC, or via an external server, as described above.

Specifically, the home screen 920 FIG. 9(b) may include an enlarged background image 921 and a plurality of enlarged execution items 922 compared to FIG. 9(a).

Meanwhile, due to a difference in resolution between a mobile device and the broadcast receiving apparatus 100, a difference in processing speed or processable data between execution items, whether an execution item supports various resolutions, etc., an item executable in the mobile device may not be executable in the broadcast receiving apparatus 100.

In this case, the controller 170 of the broadcast receiving apparatus 100 may determine inexecutable items among execution items of received home screen information, and control the determined inexecutable items to be displayed distinguishably from other items when a home screen is displayed.

Here, the distinguishable displaying may include displaying the inexecutable items as disabled items, displaying the executable items as enabled items, or a combination thereof. Alternatively, the distinguishable displaying may include highlighting or not displaying the inexecutable items.

FIG. 9(b) illustrates that objects 932, 934, 936, and 938 indicating that the folder item, the music item, the Internet item, and the image item among a plurality of execution items are inexecutable are displayed near the corresponding items. As such, a user may easily check inexecutable items when a home screen is shared.

FIG. 10 illustrates another example of a home screen shared between a mobile device and the broadcast receiving apparatus 100.

FIG. 10(a) illustrates a home screen 1010 of the second mobile device 600b used by a second user (for example, son). The home screen 1010 may include a background image 1011 and a plurality of execution items 1012. A plurality of application items are illustrated as the execution items 1012 in FIG. 10(a).

FIG. 10(b) illustrates a home screen 1020 of the broadcast receiving apparatus 100 (e.g., TV) used by the second user, which is scaled, for example, enlarged from the home screen 1010 of FIG. 10(a).

A home screen may be shared between the second mobile device 600b and the broadcast receiving apparatus 100 through one-to-one data sharing due to, for example, NFC, or via an external server, as described above.

Specifically, the home screen 1020 FIG. 10(b) may have an enlarged background image 1021 and a plurality of enlarged execution items 1022 compared to FIG. 10(a).

Meanwhile, although not shown in FIG. 10, similarly to FIG. 9, due to a difference in resolution between a mobile device and the broadcast receiving apparatus 100, a difference in processing speed or processable data between execution items, whether an execution item supports various resolutions, etc., an item executable in the mobile device may not be executable in the broadcast receiving apparatus 100.

In this case, the controller 170 of the broadcast receiving apparatus 100 may determine inexecutable application items among execution items of received home screen information, and control the determined inexecutable application items to be highlighted or not displayed when a home screen is displayed.

FIG. 11 illustrates an example of a method for sharing a home screen between a mobile device and the broadcast receiving apparatus 100.

Like FIG. 9(a), FIG. 11A illustrates a home screen 910 of the mobile device 600a of the first user.

When a home screen share mode command or a home screen external transfer mode command input by the first user is received, the mobile device 600a may display an object 1110 indicating to transmit the home screen 910 to the server 700, and transmit home screen information to the server 700, as illustrated in FIG. 11B.

FIG. 11C illustrates an object 1120 indicating to enter a home screen receive mode is displayed on the broadcast receiving apparatus 100 when a home screen receive mode command is received according to user input.

Figure 11D:
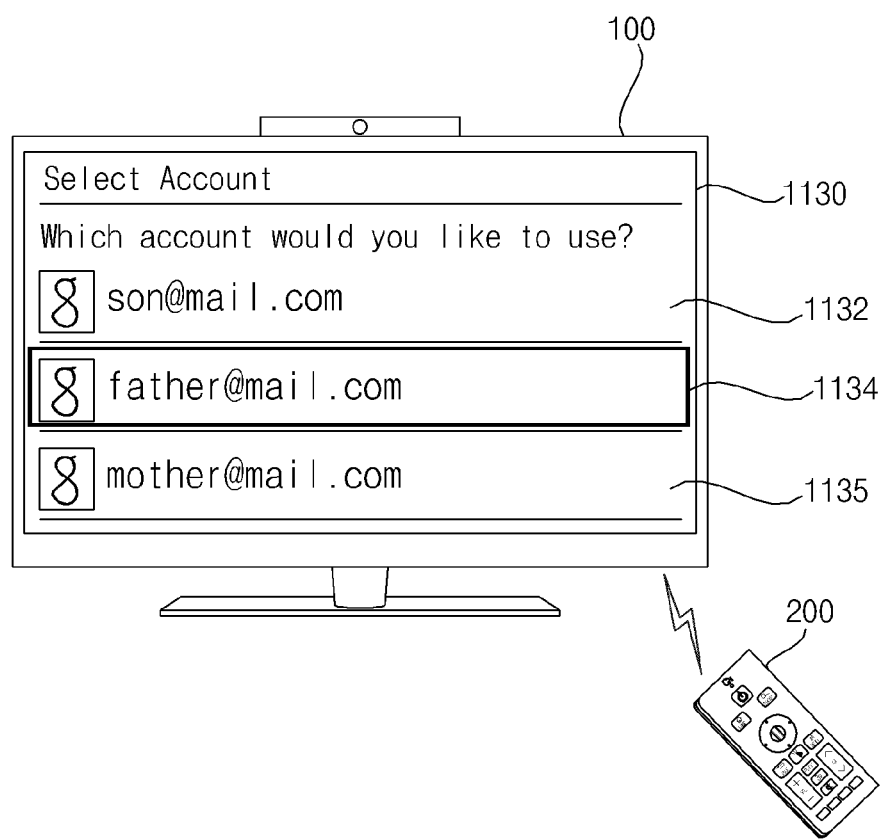

In the home screen receive mode, if a user is not logged in the server 700, a user account selection screen 1130 may be displayed as illustrated in FIG. 11D.

The user account selection screen 1130 in this case may include a plurality of user account items 1132, 1134, and 1135 for the server 700 as illustrated in FIG. 11D. If the user account item 1134 of the first user (e.g., father@mail.com) is selected, log-in information (e.g., ID and password) of the first user may be transmitted to the server 700, and the broadcast receiving apparatus 100 may be connected to the server 700.

Then, the broadcast receiving apparatus 100 connected to the server 700 may select and receive the home screen 910 corresponding to the logged-in first user.

FIG. 11D illustrates that the remote controller 200 is used to select one of the user account items 1132, 1134, and 1135. For example, any one of the user account items 1132, 1134, and 1135 may be focused and selected according to direction key input, touch input, motion input, etc.

Unlike FIG. 11D, the user account selection screen 1130 may include user account items for the broadcast receiving apparatus 100. In this case, the user account items for the broadcast receiving apparatus 100 may be associated with the user account items 1132, 1134, and 1135 for the server 700 in advance. As such, when one of the user account items for the broadcast receiving apparatus 100 is selected, log-in information of a user corresponding to the selected user account item may be transmitted directly to the server 700 without selecting one of the user account items 1132, 1134, and 1135 for the server 700, and thus the broadcast receiving apparatus 100 may be connected to the server 700.

Figure 11E:
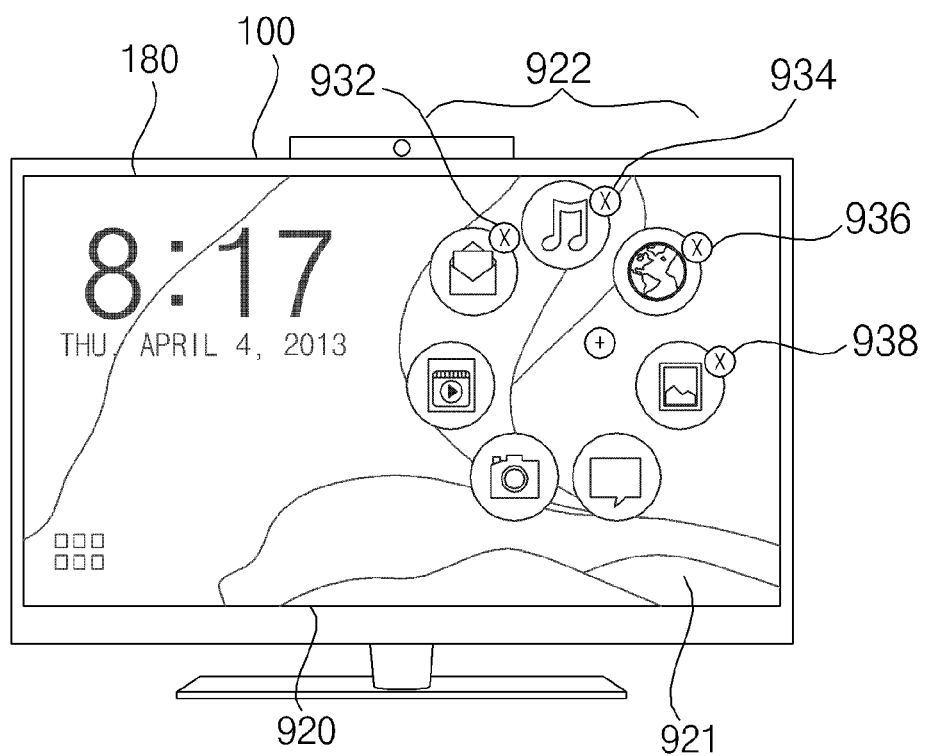

FIG. 11E illustrates that a home screen 920 which is scaled, for example, enlarged from the home screen 910 of FIG. 11A is displayed on the broadcast receiving apparatus 100 (e.g., TV). The enlarged home screen 920 is a screen enlarged from the home screen 910 of the mobile device 600a of the first user (e.g., father).

If a few items of the enlarged home screen 920 are inexecutable in the broadcast receiving apparatus 100 (e.g., TV), the inexecutable items may be highlighted.

FIG. 11E illustrates that objects 932, 934, 936, and 938 indicating that a folder item, a music item, an Internet item, and an image item among a plurality of execution items are inexecutable are displayed near the corresponding items. As such, a user may easily check inexecutable items when a home screen is shared.

FIG. 12 illustrates another example of a method for sharing a home screen between a mobile device and the broadcast receiving apparatus 100.

FIG. 12(a) illustrates that, while a home screen 1210 is being displayed on the third mobile device 600c used by a third user (e.g., mother), the third mobile device 600c approaches the broadcast receiving apparatus 100 within a certain distance to perform tagging.

In this case, the third mobile device 600c may enter a home screen share mode. As such, home screen information of the third mobile device 600c may be transmitted to the broadcast receiving apparatus 100 through NFC.

FIG. 12(b) illustrates that a user account for the server 700 is selected on the broadcast receiving apparatus 100.

Similarly to FIGS. 11A to 11E, when the third mobile device 600c used by the third user (e.g., mother) enters a home screen share mode, the third mobile device 600c may transmit the home screen 1210 of the third mobile device 600c to the server 700.

In this state, if the user account item 1135 of the third user (e.g., mather@mail.com) for the server 700 is selected on the broadcast receiving apparatus 100 as illustrated in FIG. 12(b), the broadcast receiving apparatus 100 may be connected to the server 700 to correspond to the selected user account item 1135, and receive the home screen 1210 from the server 700.

FIG. 12(c) illustrates that a home screen 1220, which is scaled, for example, enlarged from that of FIG. 12(a) after home screen sharing is performed as illustrated in FIG. 12(a) or FIG. 12(b), is displayed on the broadcast receiving apparatus 100 (e.g., TV) used by the third user. The enlarged home screen 1220 may include an enlarged background image 1221 and a plurality of enlarged application items 1222 compared to FIG. 12(a).

In this case, although not shown in FIG. 12(c), inexecutable application items may be displayed distinguishably from other items.

Figure 13:
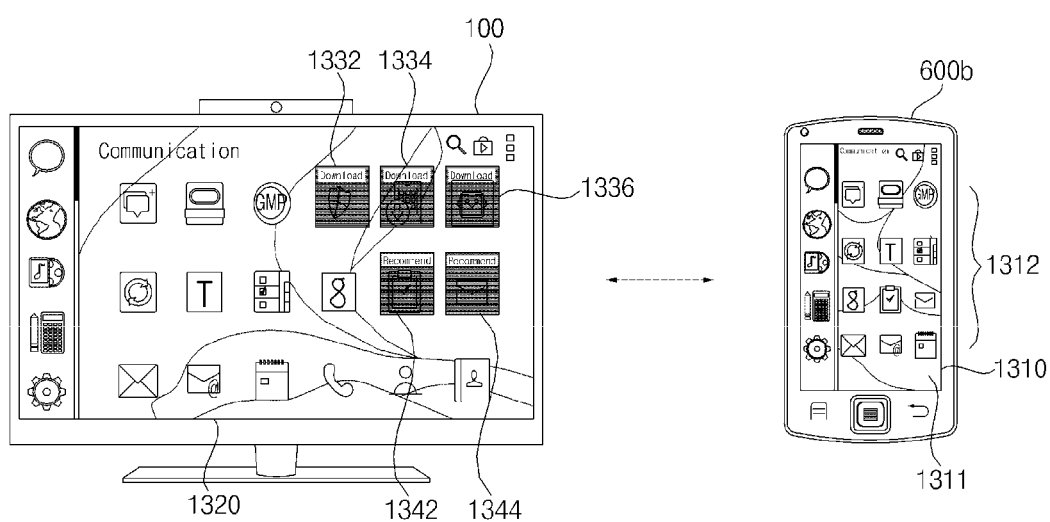

FIG. 13 illustrates another example of a home screen shared between a mobile device and the broadcast receiving apparatus 100.

Referring to FIG. 13, the mobile device 600b and the broadcast receiving apparatus 100, which are used by the second user, may share a home screen.

A home screen 1320 of the broadcast receiving apparatus 100 of FIG. 13 enlarges a background image 1311 and a plurality of application items 1312 of a home screen 1310 of the mobile device 600b. Specifically, application icons of the application items 1312, text indicating application names, etc. may be enlarged.

A few of the application items 1312 executable in the mobile device 600b may be inexecutable in the broadcast receiving apparatus 100 (e.g., TV. In this case, the user may be induced to download TV application items the same as or similar to the inexecutable application items.

The home screen 1320 of the broadcast receiving apparatus 100 of FIG. 13 may further include downloadable items 1332, 1334, and 1336, and recommended items 1342 and 1344.

The downloadable items 1332, 1334, and 1336 are TV application items downloadable from the server 700 or the like, and may correspond to the mobile device application items inexecutable in TV.

The recommended items 1342 and 1344 are TV application items downloadable from the server 700 or the like, and may be TV application items similar to the mobile device application items inexecutable in TV.

As such, application items used by a mobile device may be shared with the broadcast receiving apparatus 100, application items unusable in TV may be replaced with the same or similar application items for broadcast receiving apparatuses, and thus user convenience may be improved.

Figure 14:
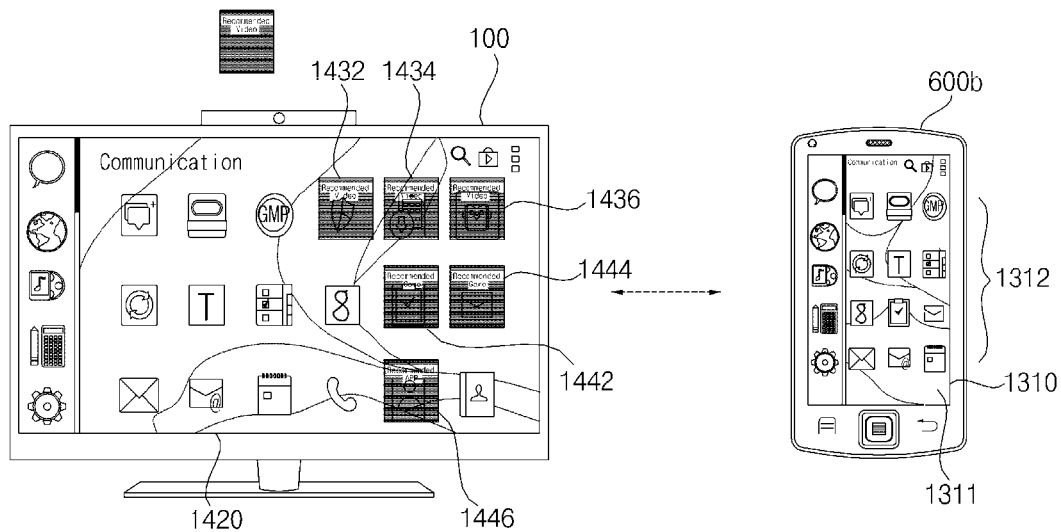

FIG. 14 illustrates another example of a home screen shared between a mobile device and the broadcast receiving apparatus 100.

When the broadcast receiving apparatus 100 is used by the second user, the second user may be logged in automatically using the camera 195, or according to additional selection of a user account. In this case, the logging in may include logging in the broadcast receiving apparatus 100 and logging in the server 700.

If the second user sets viewing information to be shared when a content image such as a broadcast image is viewed on the broadcast receiving apparatus 100, the viewing information may be transmitted to the server 700.

As such, the server 700 may collect viewing information from users of a plurality of broadcast receiving apparatuses and calculate viewer ratings or the like. In addition, the server 700 may analyze a viewing pattern of each user and recommend contents suitable for the user.

As illustrated in FIG. 14, the recommended contents may be displayed when a home screen is shared.

Similarly to FIG. 13, FIG. 14 illustrates that a home screen 1420 of the broadcast receiving apparatus 100 enlarges the background image 1311 and the application items 1312 of the home screen 1310 of the mobile device 600b.

A few of the application items 1312 executable in the mobile device 600b may be inexecutable in the broadcast receiving apparatus 100 (e.g., TV. As illustrated in FIG. 14, the display 180 of the broadcast receiving apparatus 100 may replace the inexecutable application items with recommended video items 1432, 1434, and 1436, recommended game items 1442 and 1444, a recommended application item 1446, etc. As such, a user may easily download contents suitable for a viewing pattern of the user.

In FIGS. 13 and 14, when a shared home screen is displayed on the broadcast receiving apparatus 100, items inexecutable in the broadcast receiving apparatus 100 may be replaced with message items provided by the server 700 or the mobile device 600. The message items provided by the server 700 or the mobile device 600 may include, for example, a notification message, a schedule message associated with a scheduler, etc. set by the mobile device 600.

Alternatively, these message items may be displayed additionally instead of replacing the inexecutable items. That is, while a shared home screen is being displayed on the broadcast receiving apparatus 100, when a set time comes, a notification message may be received from the server 700 and displayed on an additional message display window. In this case, the message display window may be overlapped with the displayed home screen.

On the contrary, a notification message, a schedule message associated with a scheduler, etc. set by the broadcast receiving apparatus 100 may be transmitted to the server 700. Broadcast viewing reservation information, etc. set by the broadcast receiving apparatus 100 may also be transmitted to the server 700. The message, information, etc. transmitted to the server 700 may be transmitted to a mobile device used by the same user. As such, a user may easily check a message, information, etc. set by another device, using a mobile device.

Figure 15:
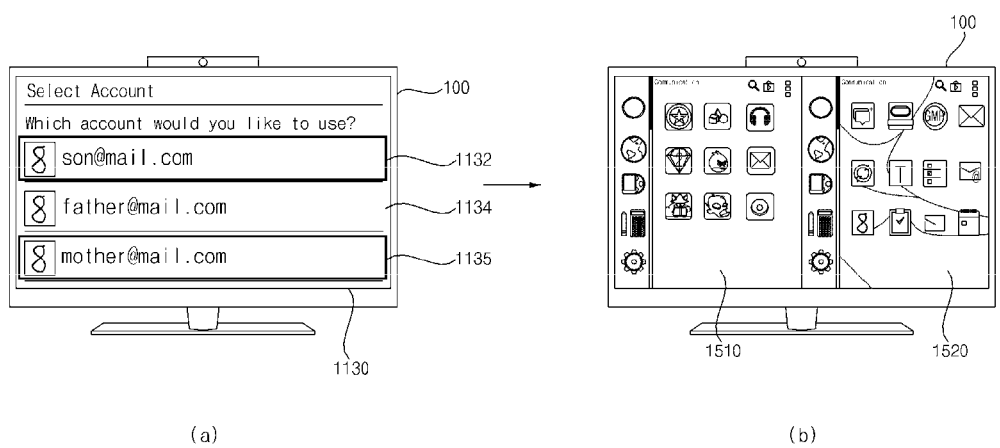

FIG. 15 illustrates that home screens for a plurality of users are displayed on the broadcast receiving apparatus 100.

In a home screen receive mode of the broadcast receiving apparatus 100, if a user is not logged in the server 700, the user account selection screen 1130 may be displayed as illustrated in FIG. 15(a). In this case, a plurality of user accounts may be selected.

FIG. 15(a) illustrates that a user account of the second user (e.g., son) and a user account of the third user (e.g., mother) are selected.

Thus, the broadcast receiving apparatus 100 may be connected to the server 700 using the user account of the second user (e.g., son) and the user account of the third user (e.g., mother) and receive home screen information for the second user (e.g., son) and home screen information for the third user (e.g., mother) together from the server 700.

As such, the display 180 of the broadcast receiving apparatus 100 may display a home screen 1520 for the second user (e.g., son) and a home screen 1510 for the third user (e.g., mother) together as illustrated in FIG. 15(*b*). Although the home screens 1510 and 1520 are displayed in different regions in FIG. 15(*b*), the two home screens 1510 and 1520 may be overlapped with each other. As such, a user may easily check a plurality of pieces of home screen information.

Figure 16:
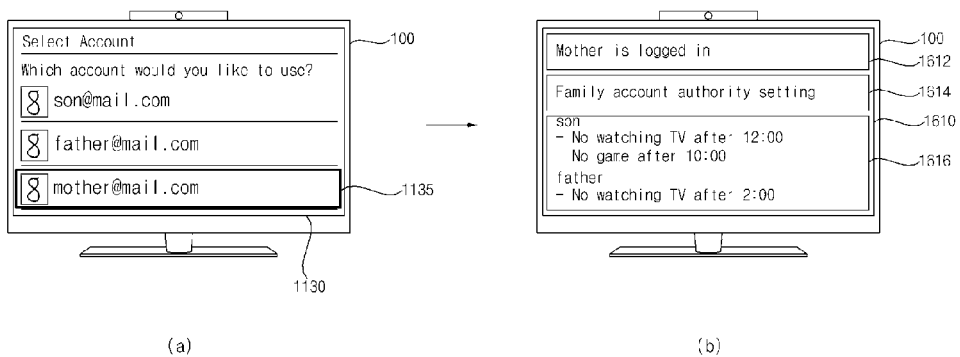

FIG. 16 illustrates an example of setting authority of a plurality of user accounts of the broadcast receiving apparatus 100.

Referring to FIG. 16, to select a user account, the user account selection screen 1130 may be displayed. FIG. 16(*a*) illustrates that a user account of the third user (e.g., mother) is selected.

Thus, as illustrated in FIG. 16(*b*), an authority setting screen 1610 for a plurality of user accounts may be displayed. In this case, an object 1612 indicating that the third user (e.g., mother) is logged in may be displayed.

The authority setting screen 1610 may include an authority setting item 1614 for a plurality of user accounts, and specific settings 1616 for each user account.

In FIG. 16(*b*), the specific settings 1616 include "No watching TV after 12:00" and "No game after 10:00" for the second user (e.g., son), and "No watching TV after 2:00" for the first user (e.g., father).

As such, authority of each user for the broadcast receiving apparatus 100 may be set.

Although not shown in FIG. 16, the third user (e.g., mother) is a master user and may execute all functions related to the broadcast receiving apparatus 100.

Figure 17:
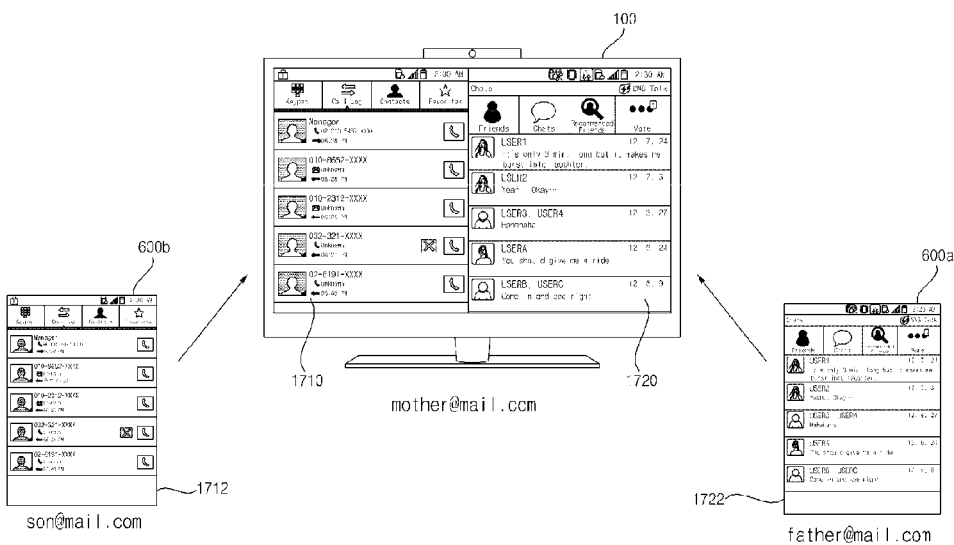

FIG. 17 illustrates that a user having master setting authority among users of the broadcast receiving apparatus 100 views information of other users.

If the first user (e.g., father) and the second user (e.g., son) agree on a monitoring function in advance, as illustrated in FIG. 17, a call log screen 1712 of the mobile device 600*b* used by the second user (e.g., son) and a messenger screen 1722 of the mobile device 600*a* used by the first user (e.g., father) may be shared with the server 700 or directly with the broadcast receiving apparatus 100.

When the third user (e.g., mother) using the broadcast receiving apparatus 100 selects a monitoring mode, the broadcast receiving apparatus 100 may enter the monitoring mode and receive the messenger screen 1722 and the call log screen 1712 from the server 700 or directly from the mobile device 600*a* and the mobile device 600*b*.

Then, the broadcast receiving apparatus 100 may scale the received messenger screen 1722 and the call log screen 1712, and display a scaled messenger screen 1720 and a call log screen 1710 together on the display 180. Although the scaled messenger screen 1720 and the call log screen 1710 are displayed in different regions in FIG. 17, the messenger screen 1720 and the call log screen 1710 may be overlapped with each other. As such, a user may easily check screen information of a mobile device of each user.

Figure 18:
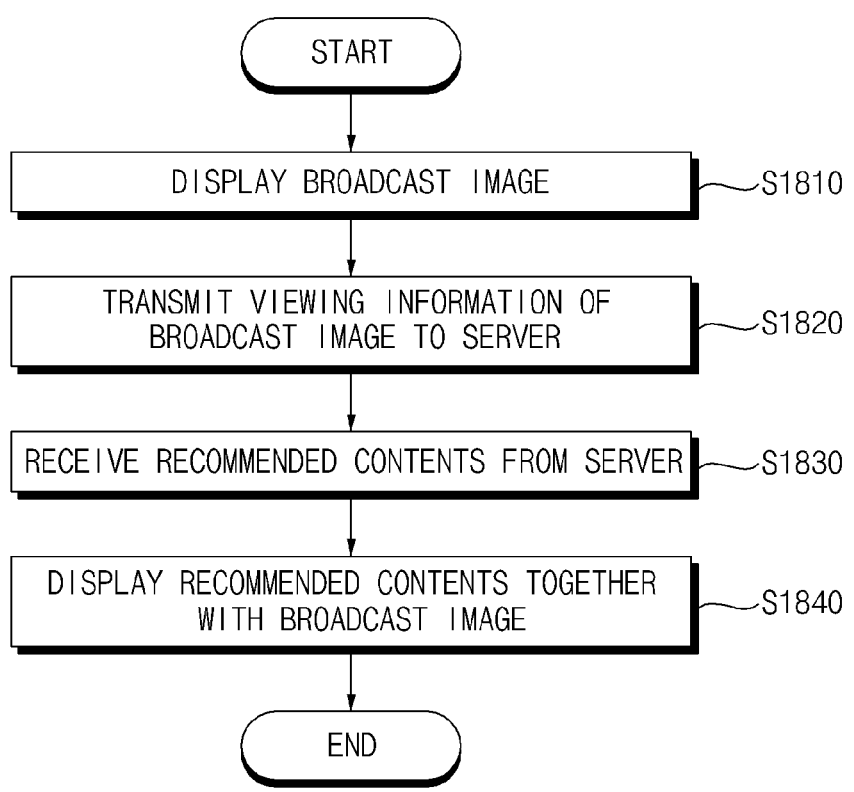
FIG. 18 is a flowchart of a method for operating a broadcast receiving apparatus, according to another embodiment of the present invention.
Figure 19A:
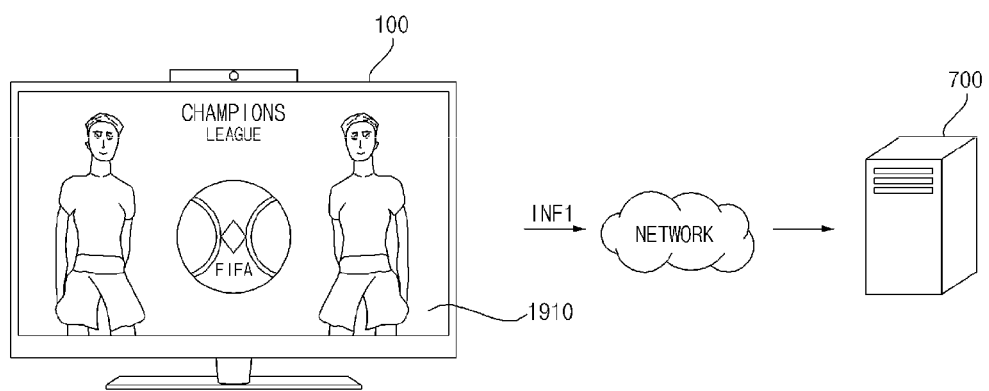
FIGS. 19A to 21 are diagrams referred to for describing the method of FIG. 18.
Figure 19B:
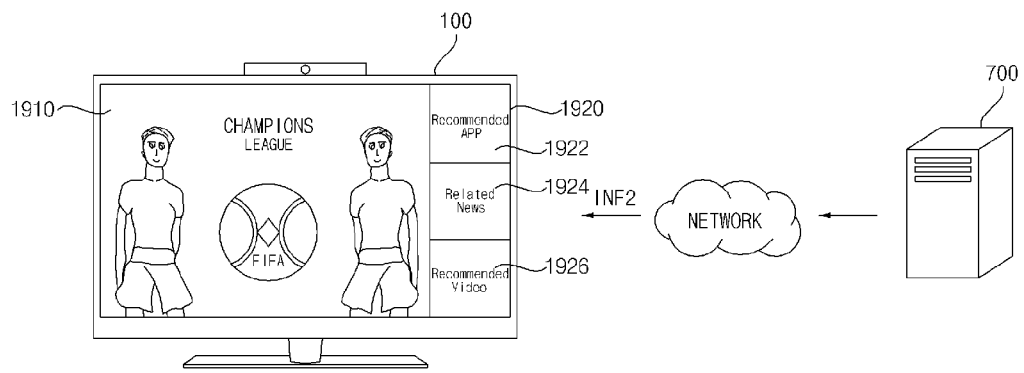
Figure 19C:
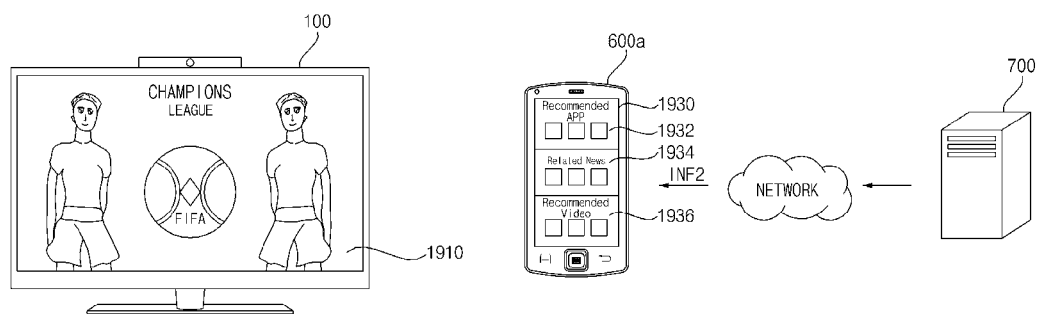
Figure 20:
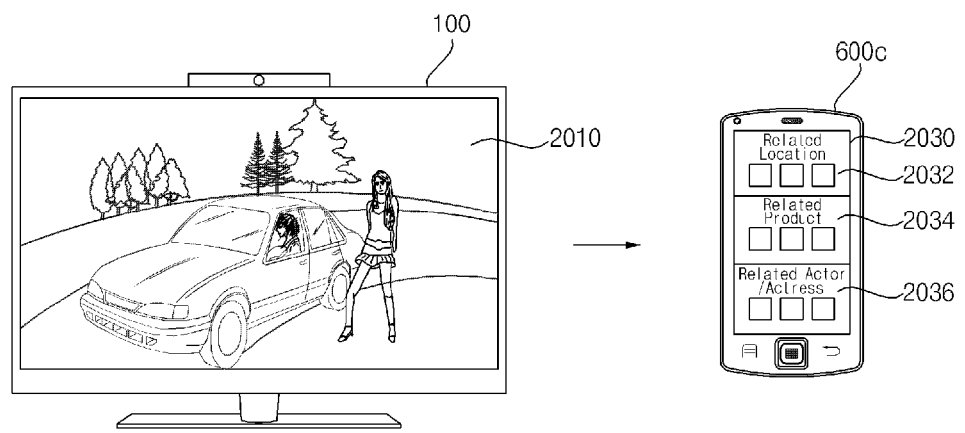
Figure 21:
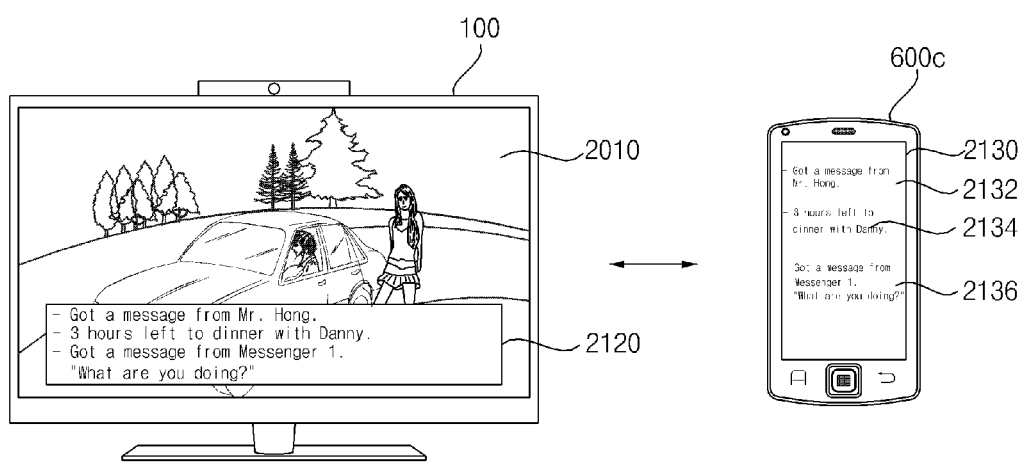

FIG. 18 is a flowchart of a method for operating the broadcast receiving apparatus 100, according to another embodiment of the present invention, and FIGS. 19 to 21 are diagrams referred to for describing the method of FIG. 18.

Referring to FIG. 18, the broadcast receiving apparatus 100 displays a broadcast image (S1810).

The broadcast receiver 105 of the broadcast receiving apparatus 100 receives a broadcast signal, and the controller 170 controls the display 180 to display a broadcast image processed based on the broadcast signal.

FIG. 19A illustrates that a certain broadcast image 1910 is displayed on the display 180 of the broadcast receiving apparatus 100.

Then, the broadcast receiving apparatus 100 transmits viewing information of the broadcast image to the server 700 (S1820). If the broadcast receiving apparatus 100 is in a broadcast image viewing information share mode, the network interface 130 transmits viewing information of the broadcast image which is currently viewed, to the server 700.

Here, the viewing information of the broadcast image may include channel information, program information, a viewing time, etc. of the broadcast image. User information a user who is watching the broadcast image may also be transmitted. The user information may be transmitted to the server 700 if the user is logged in the broadcast receiving apparatus 100. The user may be logged in based on an image captured by the camera 195, or using a user account selection screen, as described above.

FIG. 19A illustrates that, while a certain broadcast image 1910 is being displayed on the display 180 of the broadcast receiving apparatus 100, viewing information Inf1 of the broadcast image 1910 is transmitted to the server 700.

The server 700 may generate recommended content information Inf2 including applications, news, recommended videos, etc. related to the broadcast image 1910, based on the viewing information Inf1 received from the broadcast receiving apparatus 100. Then, the server 700 may transmit the recommended content information Inf2 to the broadcast receiving apparatus 100.

Thus, the broadcast receiving apparatus 100 receives the recommended content information Inf2 related to the viewing information Inf1 from the server 700 (S1830).

FIG. 19B illustrates that the network interface 130 of the broadcast receiving apparatus 100 receives the recommended content information Inf2 including applications, news, recommended videos, etc., from the server 700.

Then, the broadcast receiving apparatus 100 displays recommended contents together with the broadcast image (S1840).

The controller 170 of the broadcast receiving apparatus 100 processes the received recommended content information Inf2 and controls the display 180 to display the recommended content information Inf2.

In this case, recommended content information 1920 corresponding to the recommended content information Inf2 and including a recommended application item 1922, a related news item 1924, and a recommended video item 1926 may be displayed on the display 180 together with the broadcast image 1910.

Particularly, if a recommended content information display command is received according to user input, the recommended content information 1920 may be displayed on an edge region, which is less critical, so as not to disturb viewing of the broadcast image 1910.

Alternatively, unlike FIG. 19B, recommended content information 1930 may be displayed on the mobile device 600*a* used by a user who is watching the broadcast receiving apparatus 100.

FIG. 19C illustrates that, when the first user (e.g., father) is logged in the broadcast receiving apparatus 100 and watches the broadcast image 1910 on the broadcast receiving apparatus 100, the recommended content information 1930 is displayed on the mobile device 600a of the first user (e.g., father) not to disturb viewing of the broadcast image 1910.

In this case, the mobile device 600a may receive the recommended content information Inf2 for the first user from the server 700, and thus display the recommended content information 1930 including a recommended application item 1932, a related news item 1934, and a recommended video item 1936.

The recommended content information 1930 displayed on the mobile device 600a may be reduced from the recommended content information 1930 displayed on the broadcast receiving apparatus 100 of FIG. 19B.

FIG. 20 is similar to FIG. 19 and illustrates that, while a broadcast image 2010 is being viewed using the broadcast receiving apparatus 100, information about locations, actors/actresses, and products related to the broadcast image 2010 is displayed on the mobile device 600c.

Although not shown in FIG. 20, similarly to FIG. 19, if the broadcast receiving apparatus 100 is in a product recommend mode related to the broadcast image 2010, viewing information of the broadcast image 2010 may be transmitted to the server 700 and the information about locations, actors/actresses, and products related to the broadcast image 2010 may be transmitted from the server 700 to the broadcast receiving apparatus 100 or the mobile device 600c. In this case, the mobile device 600c may be a mobile device of the third user using the broadcast receiving apparatus 100.

As such, the mobile device 600c may display recommended content information 2030 including a related location item 2032, a related product item 2034, and a related actor/actress item 2036.

FIG. 21 is similar to FIG. 20 and illustrates that, while the broadcast image 2010 is being viewed using the broadcast receiving apparatus 100, an SMS message, a notification message, etc. received by the mobile device 600c is displayed on the broadcast receiving apparatus 100.

Although not shown in FIG. 21, similarly to FIG. 19, if a message share mode is set between the broadcast receiving apparatus 100 and the mobile device 600c used by the third user, an SMS message, a notification message, etc. may be transmitted from the mobile device 600c or the server 700, to the broadcast receiving apparatus 100.

Specifically, FIG. 21 illustrates that the mobile device 600c displays a message screen including an SMS message 2132, a schedule notification message 2134, and a messenger message 2136.

Thus, as illustrated in FIG. 21, the broadcast receiving apparatus 100 may display a message 2120 including an SMS message, a notification message, a messenger message, etc., together with the broadcast image 2010.

Although FIGS. 19A to 21 illustrate transmission of viewing information of a broadcast image and display of recommended contents in a case when a single user is logged in the broadcast receiving apparatus 100, the above description may be extended to a case when a plurality of users are logged in the broadcast receiving apparatus 100, as illustrated in FIG. 15.

For example, if the second user (e.g., son) and the third user (e.g., mother) are logged in the broadcast receiving apparatus 100 as illustrated in FIG. 15(a), the broadcast receiving apparatus 100 may transmit viewed broadcast image information and user information together to the server 700.

The server 700 may select recommended contents in consideration of a viewing history of each user as well as the broadcast image information currently viewed by the user, and transmit recommended content information for each user to the broadcast receiving apparatus 100.

As such, the broadcast receiving apparatus 100 may display the received recommended content information together with a broadcast image for each user.

The recommended content information for each user may be transmitted to the corresponding mobile device 600b or 600c in addition to the broadcast receiving apparatus 100. As such, each user may easily check recommended contents suitable for a broadcast image currently viewed by the user or a viewing history of the user, on the mobile device 600b or 600c of the user.

Figure 22:
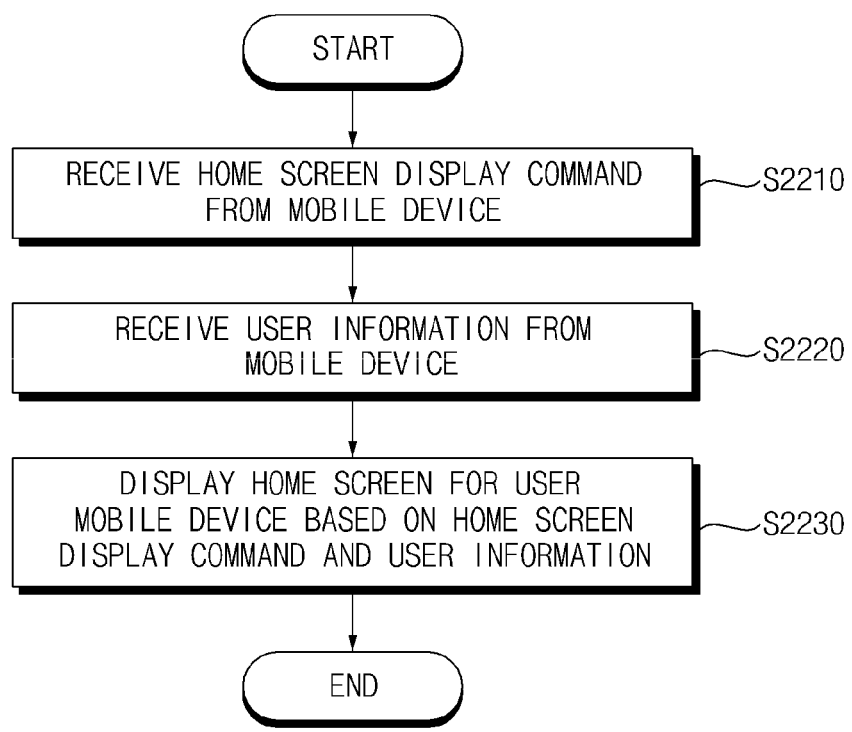
FIG. 22 is a flowchart of a method for operating a broadcast receiving apparatus, according to another embodiment of the present invention.

FIG. 22 is a flowchart of a method for operating the broadcast receiving apparatus 100, according to another embodiment of the present invention, and FIGS. 23A to 28 are diagrams referred to for describing the method of FIG. 22.

Referring to FIG. 22, the broadcast receiving apparatus 100 receives a home screen display command from a mobile device 600 (S2210). Then, the broadcast receiving apparatus 100 receives user information from the mobile device 600 (S2220). Then, the broadcast receiving apparatus 100 displays a home screen for a user of the mobile device 600 among a plurality of home screens based on the home screen display command and the user information (S2230).

The network interface 130 or the user input interface 150 of the broadcast receiving apparatus 100 may receive the home screen display command and the user information from the mobile device 600.

For example, while an application for remotely controlling the broadcast receiving apparatus 100 is being executed in the mobile device 600, if a power-on command is received, the network interface 130 or the user input interface 150 of the broadcast receiving apparatus 100 may receive the power-on command, and the controller 170 of the broadcast receiving apparatus 100 may control the power supply 190 to power on the display 180. In this case, the power-on command may correspond to the home screen display command.

After that, the network interface 130 or the user input interface 150 of the broadcast receiving apparatus 100 may request the mobile device 600 to transmit the user information, and receive the user information from the mobile device 600 in response to the request.

The controller 170 of the broadcast receiving apparatus 100 may control connection to the server 700 according to the user information received from the mobile device 600, and control reception of home screen information related to the user of the mobile device 600 from the server 700. Specifically, the controller 170 may transmit the user information received from the mobile device 600, to the server 700 and request the server 700 to transmit home screen information according to the user information. As such, the network interface 130 of the broadcast receiving apparatus 100 may receive the home screen information related to the user of the mobile device 600 from the server 700.

Then, the controller 170 of the broadcast receiving apparatus 100 may scale at least one of a background image and a plurality of execution items included in the home screen information, and control the display 180 to display a scaled home screen. As described above, a home screen desired by a user may be easily displayed according to a home screen display command received from the mobile device 600, and thus user convenience may be improved.

As another example, while the broadcast receiving apparatus 100 is being powered on to display a certain image, if a home screen display command is received from the mobile device 600, the network interface 130 or the user input interface 150 of the broadcast receiving apparatus 100 receives the home screen display command. After that, the network interface 130 or the user input interface 150 of the broadcast receiving apparatus 100 may request the mobile device 600 to transmit user information, and receive the user information from the mobile device 600 in response to the request.

Then, the broadcast receiving apparatus 100 may receive home screen information related to the user of the mobile device 600 from the server 700 as described above, and switch the displayed certain image into the home screen. As such, a home screen desired by a user may be easily displayed and thus user convenience may be improved A detailed description is now given of the method of FIG. 22 with reference to FIGS. 23A to 28.

Figure 23A:
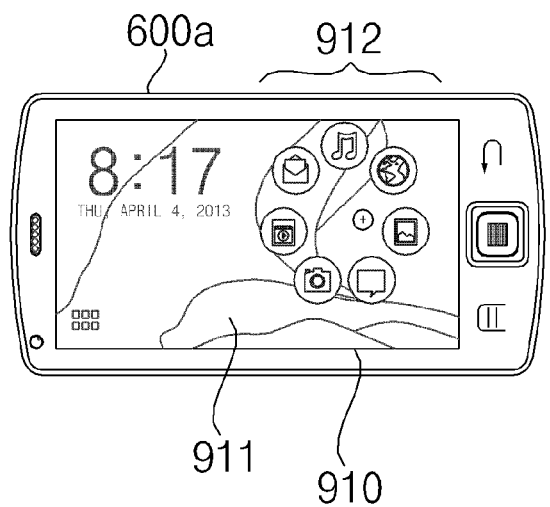
FIGS. 23A to 28 are diagrams referred to for describing the method of FIG. 22.
Figure 23B:
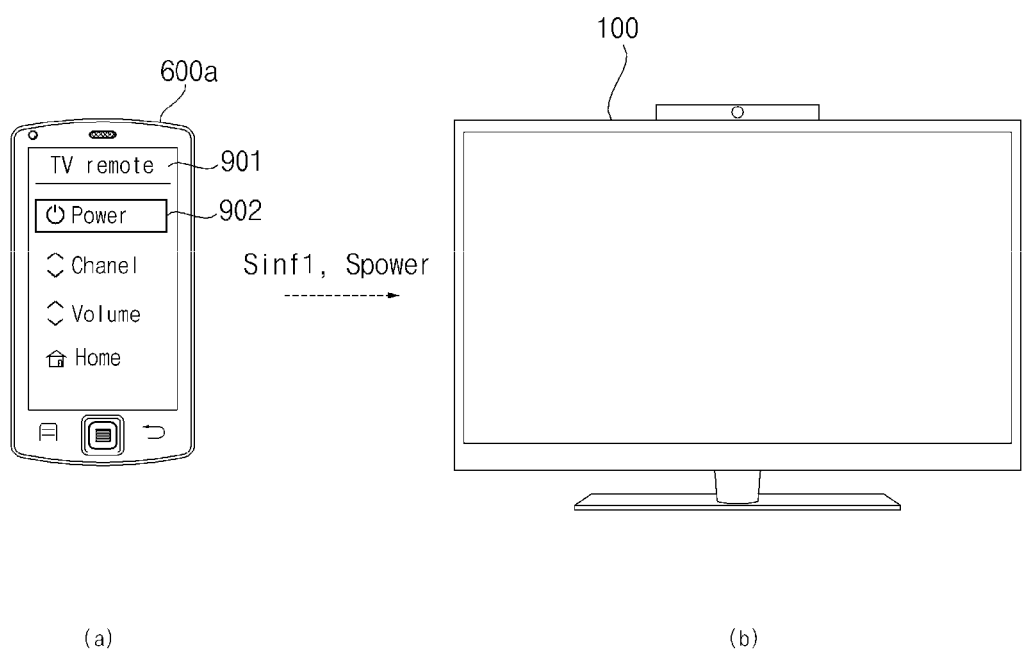
Figure 23C:
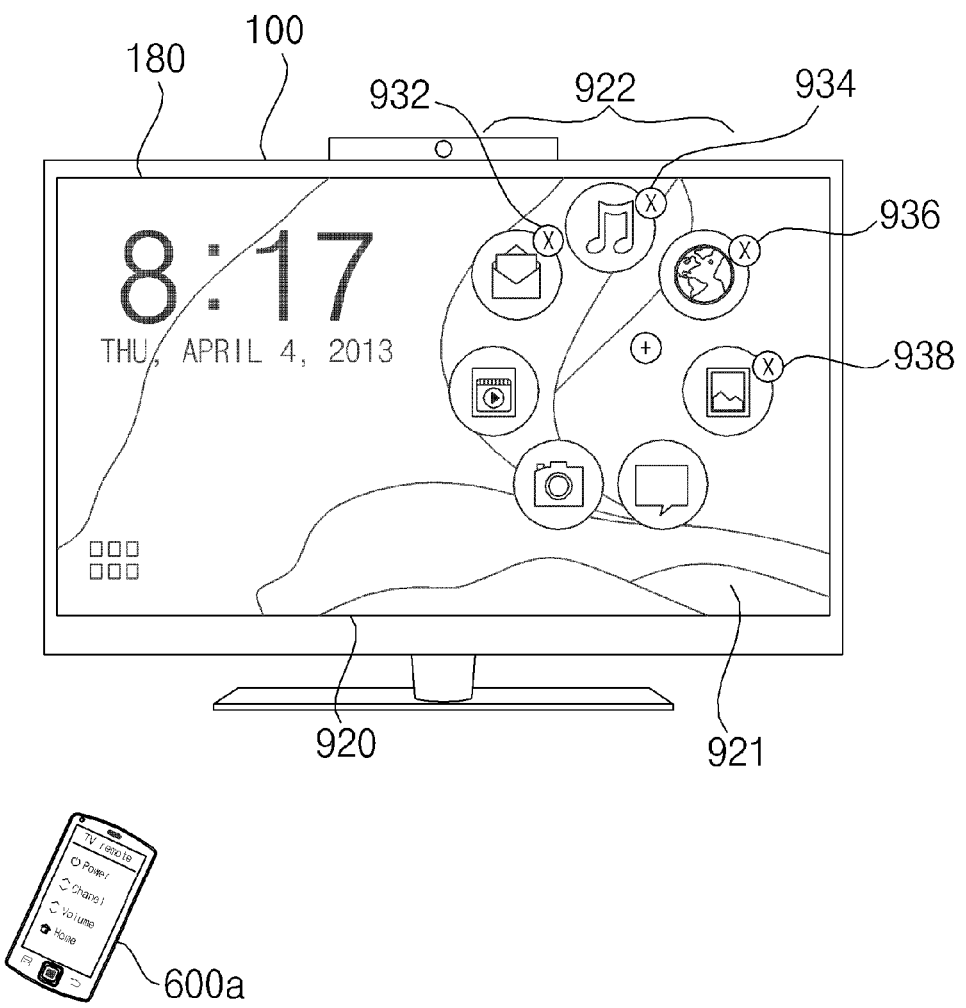

FIGS. 23A to 23C illustrate an example of home screen sharing between the first mobile device 600a and the broadcast receiving apparatus 100.

FIG. 23A illustrates a home screen 910 of the first mobile device 600a used by the first user (for example, father). The home screen 910 may include a background image 911 and a plurality of execution items 912. Although not marked with reference numerals in FIG. 23A, the execution items 912 include a folder item, a music item, an Internet item, an image item, a messenger item, a camera item, and a video item. When one of these execution items 912 is selected, a corresponding operation may be performed.

FIG. 23B illustrates that an application for remotely controlling the broadcast receiving apparatus 100 is executed in the first mobile device 600a and thus a corresponding application screen 901 is displayed. In this case, the application screen 901 may include a power item 902, a channel selection item, a volume control item, a home screen item, etc.

If the power item 902 of the application screen 901 is selected, a power on signal Spower may be transmitted to the broadcast receiving apparatus 100. In this case, user information Sinf1 of the first mobile device 600a may be transmitted to the broadcast receiving apparatus 100 upon a request of the broadcast receiving apparatus 100, or even without a request. The controller 170 of the broadcast receiving apparatus 100 may log a user in the broadcast receiving apparatus 100 based on the received user information Sinf1 of the first mobile device 600a.

The broadcast receiving apparatus 100 may power on the display 180 or the like according to the power-on signal Spower, and display a home screen. That is, the broadcast receiving apparatus 100 may process the power-on signal Spower as a home screen display command signal.

As such, as illustrated in FIG. 23C, a home screen 920 which is scaled, for example, enlarged from the home screen 910 of FIG. 23A may be displayed on the broadcast receiving apparatus 100 (e.g., TV) used by the first user.

The broadcast receiving apparatus 100 may receive home screen information through the server 700 as described above, or directly from the first mobile device 600a.

After the home screen information is received, the broadcast receiving apparatus 100 may display the enlarged home screen 920 as illustrated in FIG. 23C through processing, for example, scaling.

Figure 24A:
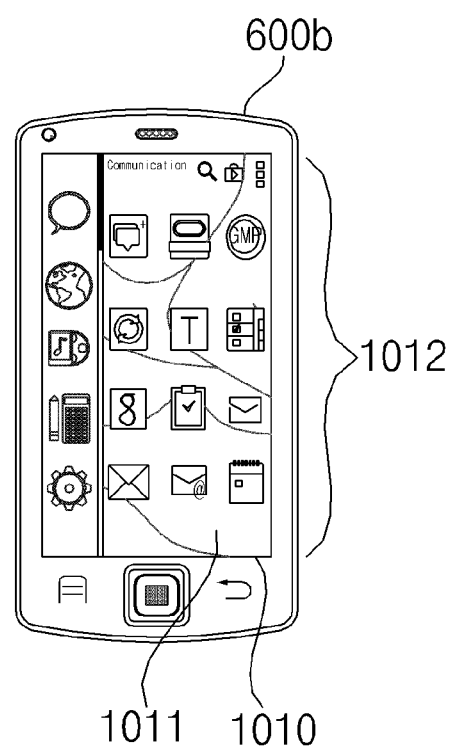
Figure 24B:
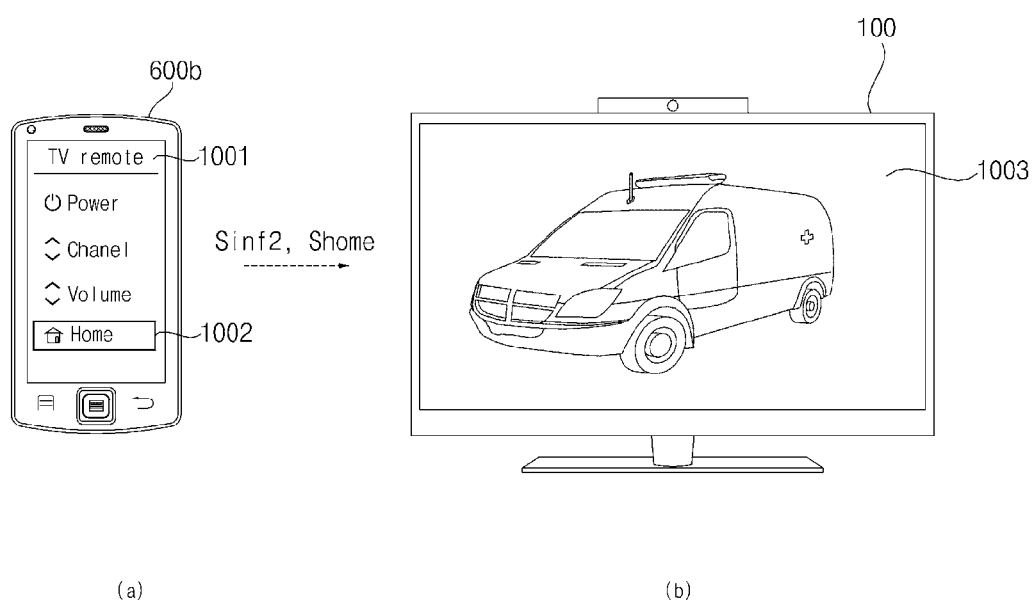
Figure 24C:
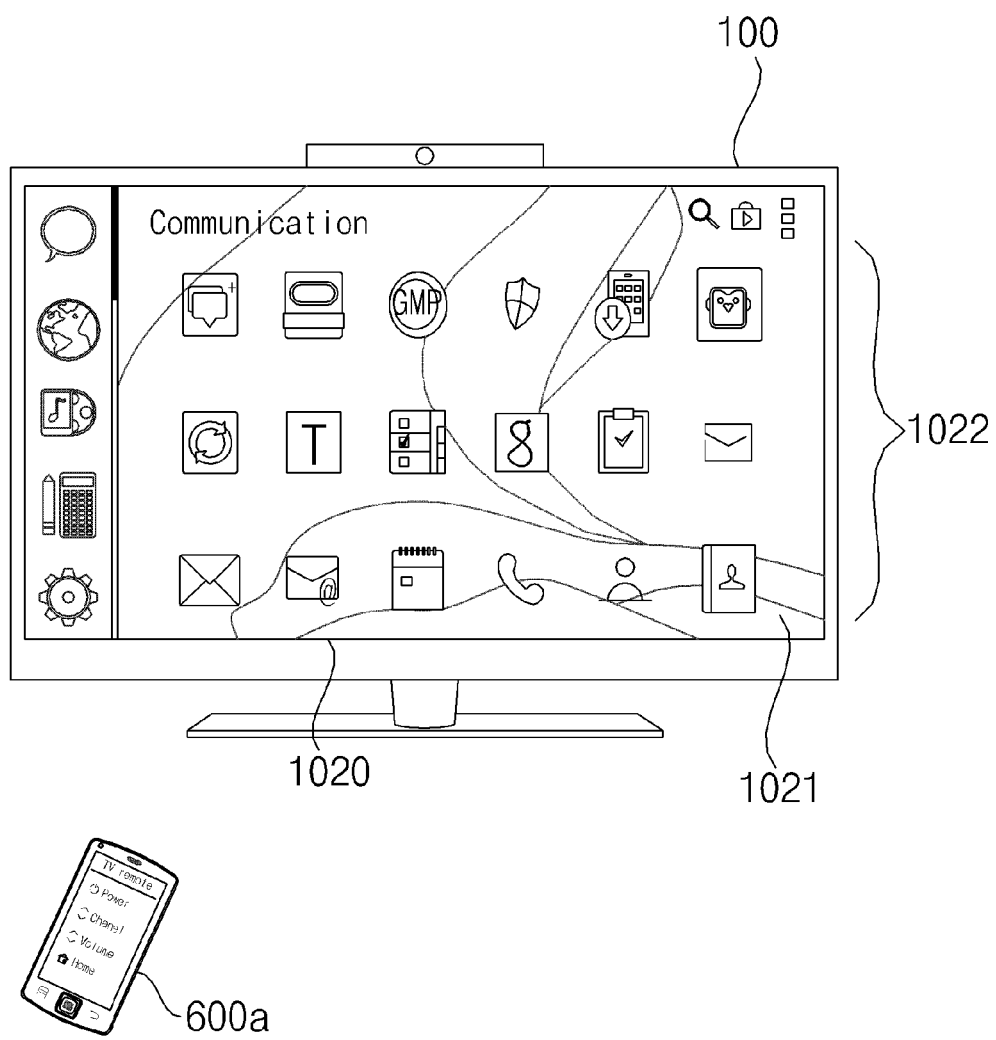

FIGS. 24A to 24C illustrate an example of home screen sharing between the second mobile device 600b and the broadcast receiving apparatus 100.

FIG. 24A illustrates a home screen 1010 of the second mobile device 600b used by the second user (e.g., son). The home screen 1010 may include a background image 1011 and a plurality of execution items 1012. A plurality of application items are illustrated as the execution items 1012 in FIG. 24A.

FIG. 24B illustrates that an application for remotely controlling the broadcast receiving apparatus 100 is executed in the second mobile device 600b and thus a corresponding application screen 1001 is displayed, and a certain image 1003 is displayed on the broadcast receiving apparatus 100. In this case, the application screen 1001 may include a power item, a channel selection item, a volume control item, a home screen item 1002, etc.

If the home screen item 1002 of the application screen 1001 is selected, a home screen switch signal Shome may be transmitted to the broadcast receiving apparatus 100. In this case, user information Sinf2 of the second mobile device 600b may be transmitted to the broadcast receiving apparatus 100 upon a request of the broadcast receiving apparatus 100, or even without a request. The controller 170 of the broadcast receiving apparatus 100 may log a user in the broadcast receiving apparatus 100 based on the received user information Sinf2 of the second mobile device 600b.

The broadcast receiving apparatus 100 may switch a screen displayed on the display 180 according to the home screen switch signal Shome, and display a home screen.

As such, as illustrated in FIG. 24C, a home screen 1020 which is scaled, for example, enlarged from the home screen 1010 of FIG. 24A may be displayed on the broadcast receiving apparatus 100 (e.g., TV) used by the second user.

The broadcast receiving apparatus 100 may receive home screen information through the server 700 as described above, or directly from the second mobile device 600b.

After the home screen information is received, the broadcast receiving apparatus 100 may display the enlarged home screen 1020 as illustrated in FIG. 24C through processing, for example, scaling.

FIGS. 25A to 25E illustrate an example of a method for sharing a home screen between a mobile device and the broadcast receiving apparatus 100.

Figure 25A:
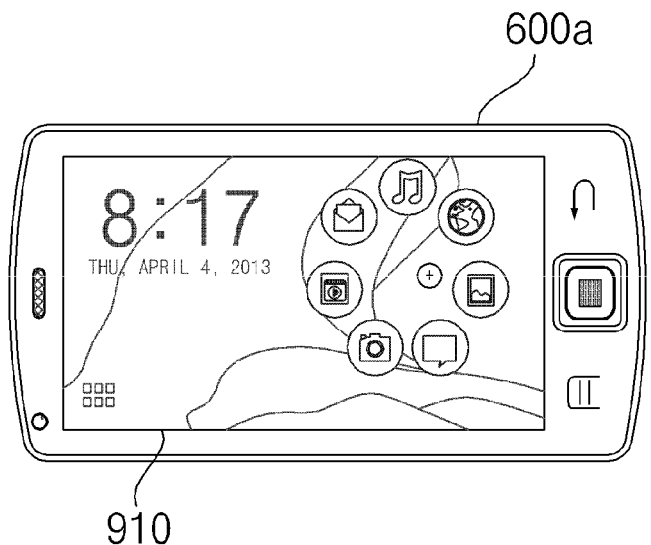

FIG. 25A illustrates a home screen 910 of the mobile device 600a of the first user.

Figure 25B:
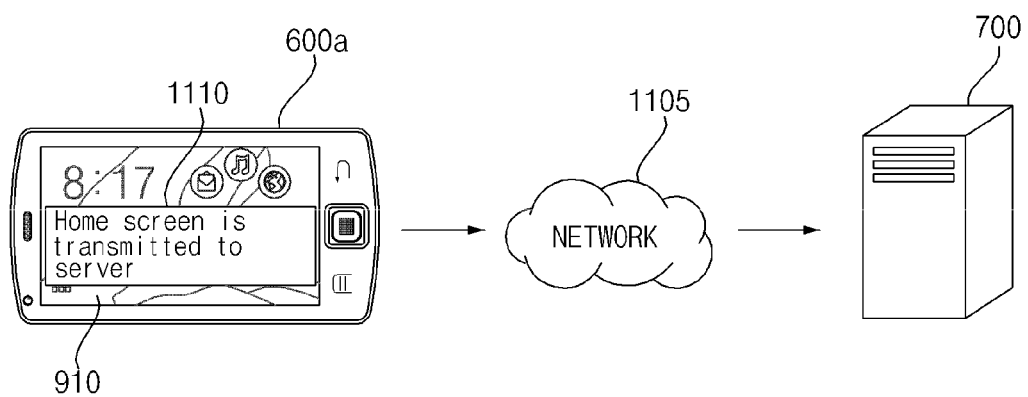

When a home screen share mode command or a home screen external transfer mode command input by the first user is received, the mobile device 600a may display an object 910 indicating to transmit the home screen 910 to the server 700, and transmit home screen information to the server 700, as illustrated in FIG. 25B.

Figure 25C:
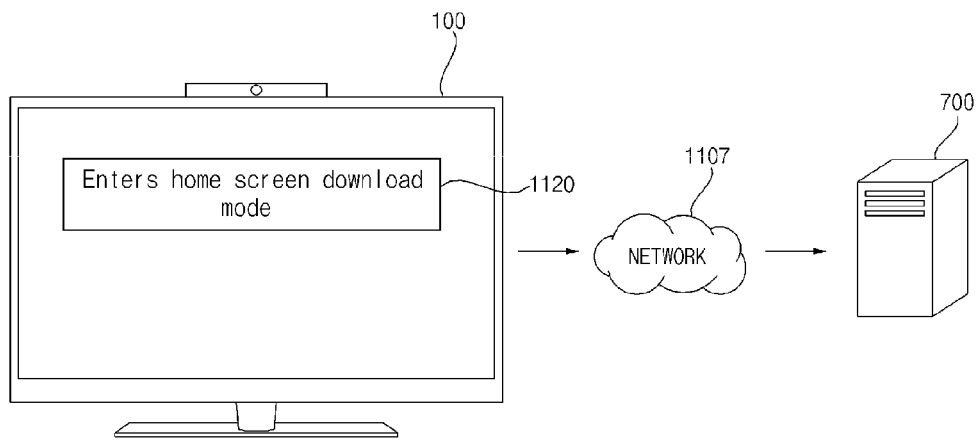

FIG. 25C illustrates an object 1120 indicating to enter a home screen receive mode is displayed on the broadcast receiving apparatus 100 when a home screen display command is received according to user input.

Figure 25D:
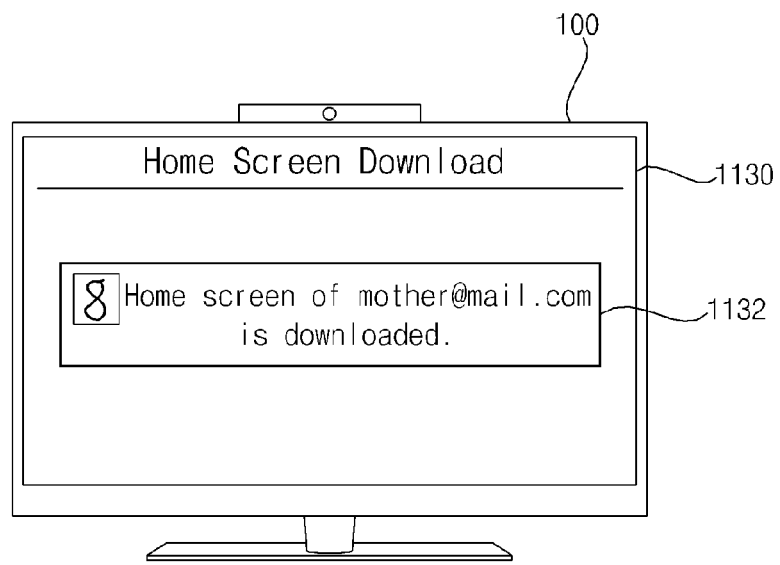

In the home screen receive mode, if a user is logged in the server 700, an object 1132 indicating to download a home screen corresponding to the logged in user may be displayed as illustrated in FIG. 25D. Otherwise, if a user is not logged in the server 700, a user account selection screen may be displayed.

Figure 25E:
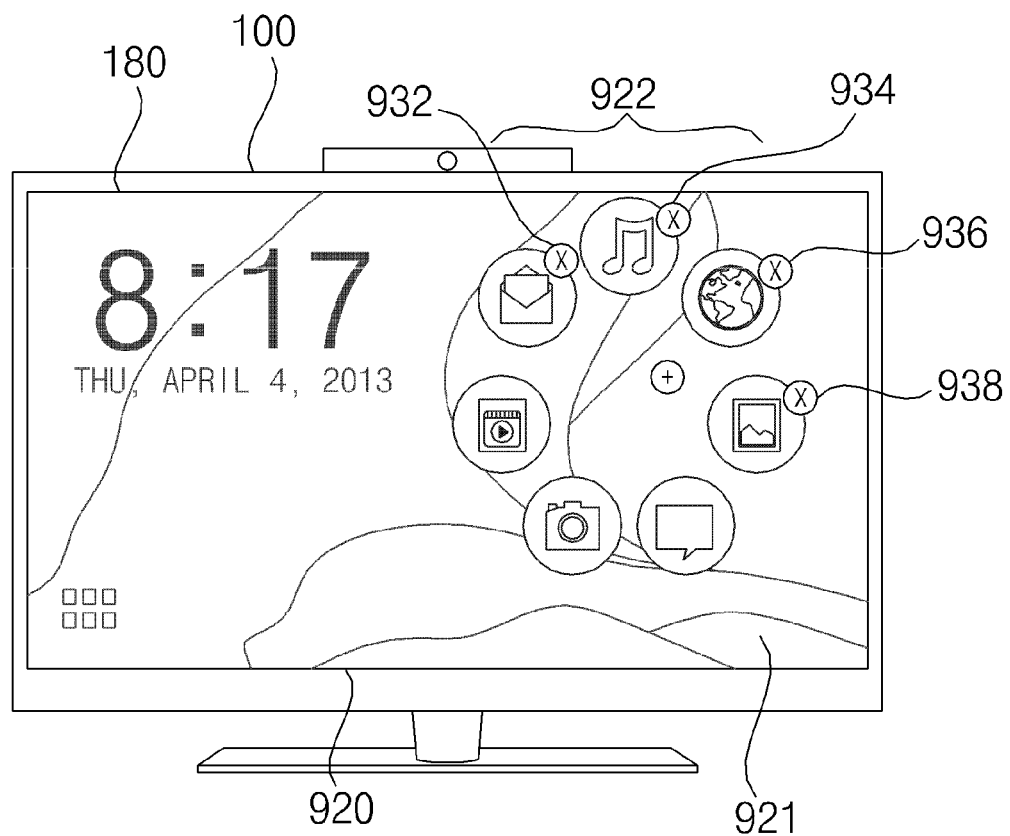

FIG. 25E illustrates a home screen 920 which is scaled, for example, enlarged from the home screen 910 of FIG. 25A is displayed on the broadcast receiving apparatus 100 (e.g., TV). The enlarged home screen 920 is a screen enlarged from the home screen 910 of the first mobile device 600a of the first user (e.g., father).

If a few items of the enlarged home screen 920 are inexecutable in the broadcast receiving apparatus 100 (e.g., TV), the inexecutable items may be highlighted.

FIG. 25E illustrates that objects 932, 934, 936, and 938 indicating that a folder item, a music item, an Internet item, and an image item among a plurality of execution items are inexecutable are displayed near the corresponding items. As such, a user may easily check inexecutable items when a home screen is shared.

Figure 26:
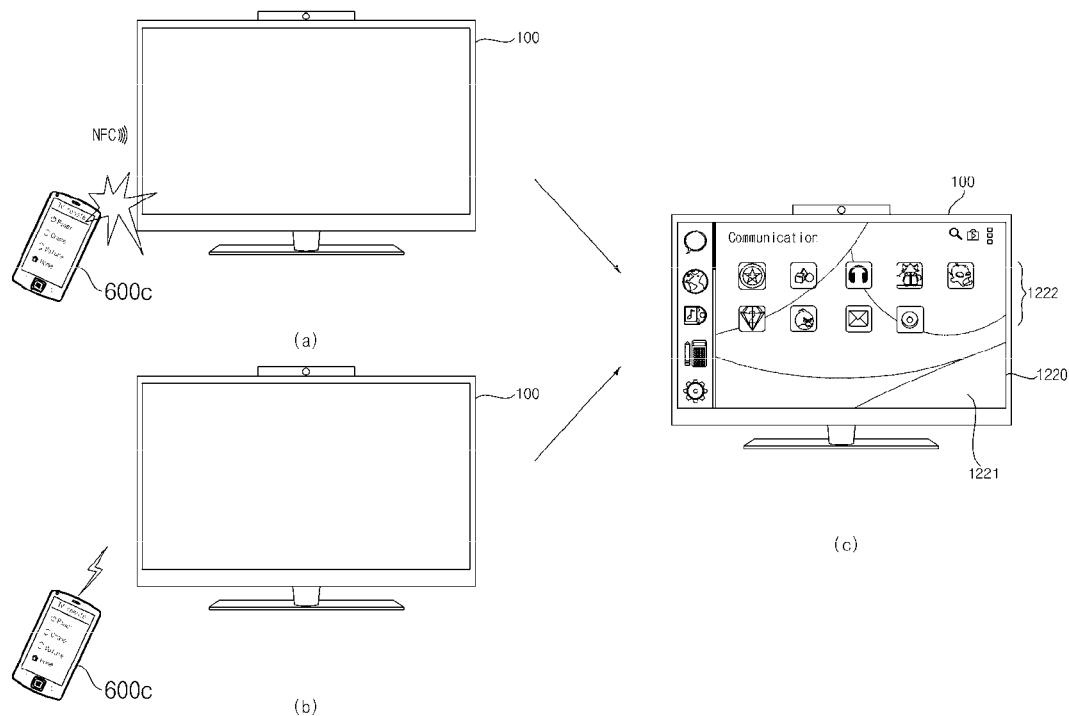

FIG. 26 illustrates another example of a method for sharing a home screen between a mobile device and the broadcast receiving apparatus 100.

FIG. 26(a) illustrates that, while an application screen for remotely controlling the broadcast receiving apparatus 100 is being displayed on the third mobile device 600c used by the third user (e.g., mother), the third mobile device 600c approaches the broadcast receiving apparatus 100 within a certain distance to perform tagging. Particularly, while a power item or a home screen item of the application screen is being selected, if the third mobile device 600c approaches the broadcast receiving apparatus 100 within a certain distance to perform tagging, the third mobile device 600c may enter a home screen share mode. In this case, user information of the third mobile device 600c may be transmitted to the broadcast receiving apparatus 100 through NFC.

The broadcast receiving apparatus 100 may display a home screen 1220 for the third user as illustrated in FIG. 26(c) based on the home screen display command and the user information.

In this case, home screen information for the third user may be transmitted from the third mobile device 600c to the broadcast receiving apparatus 100 through NFC. Alternatively, the home screen information may be transmitted from the server 700 to the broadcast receiving apparatus 100.

FIG. 26(b) illustrates that, while the application screen for remotely controlling the broadcast receiving apparatus 100 is being displayed on the third mobile device 600c used by the third user (e.g., mother) as described above, the power item or the home screen item is selected and the home screen display command is received by the broadcast receiving apparatus 100 in a wireless manner. In this case, the user information of the third mobile device 600c may be transmitted to the broadcast receiving apparatus 100 through wireless communication.

The broadcast receiving apparatus 100 may display the home screen 1220 for the third user as illustrated in FIG. 26(c) based on the home screen display command and the user information.

The home screen 1220 of FIG. 26(c) may correspond to a home screen used by the third user in the third mobile device 600c. FIG. 26(c) illustrates the scaled, for example, enlarged home screen 1220 is displayed on the broadcast receiving apparatus 100 (e.g., TV). The enlarged home screen 1220 may include an enlarged background image 1221 and a plurality of enlarged application items 1222.

In this case, although not shown in FIG. 26(c), inexecutable application items may be displayed distinguishably from other items.

Figure 27A:
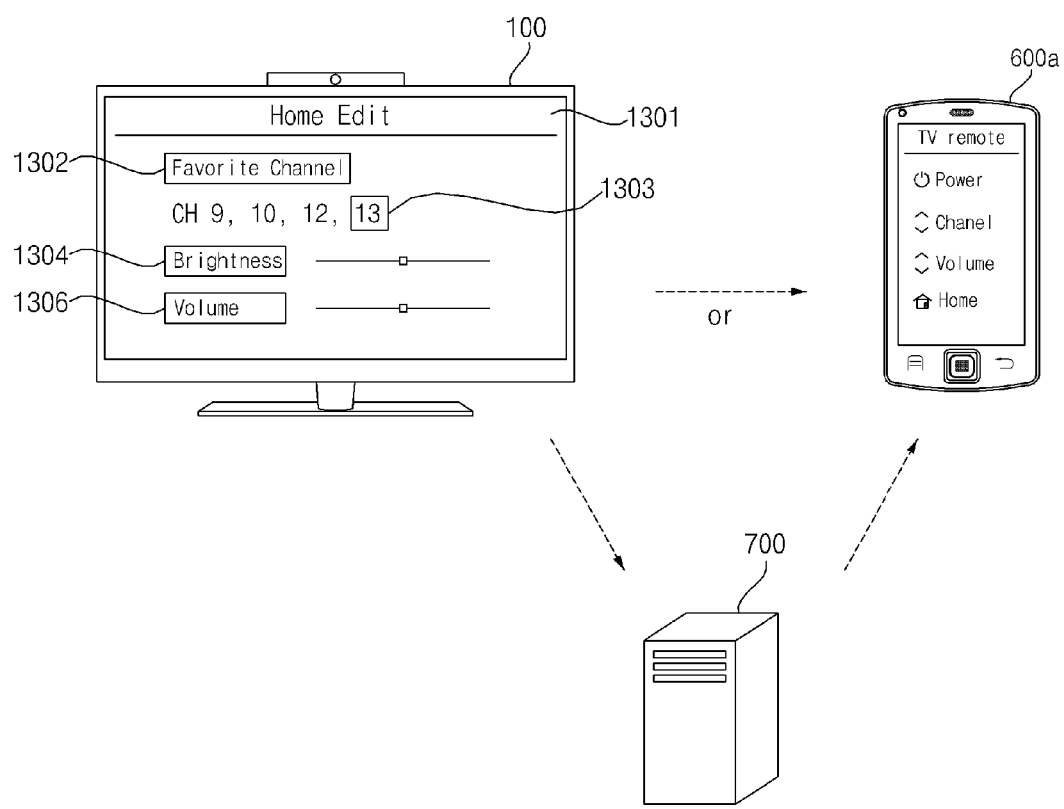
Figure 27B:
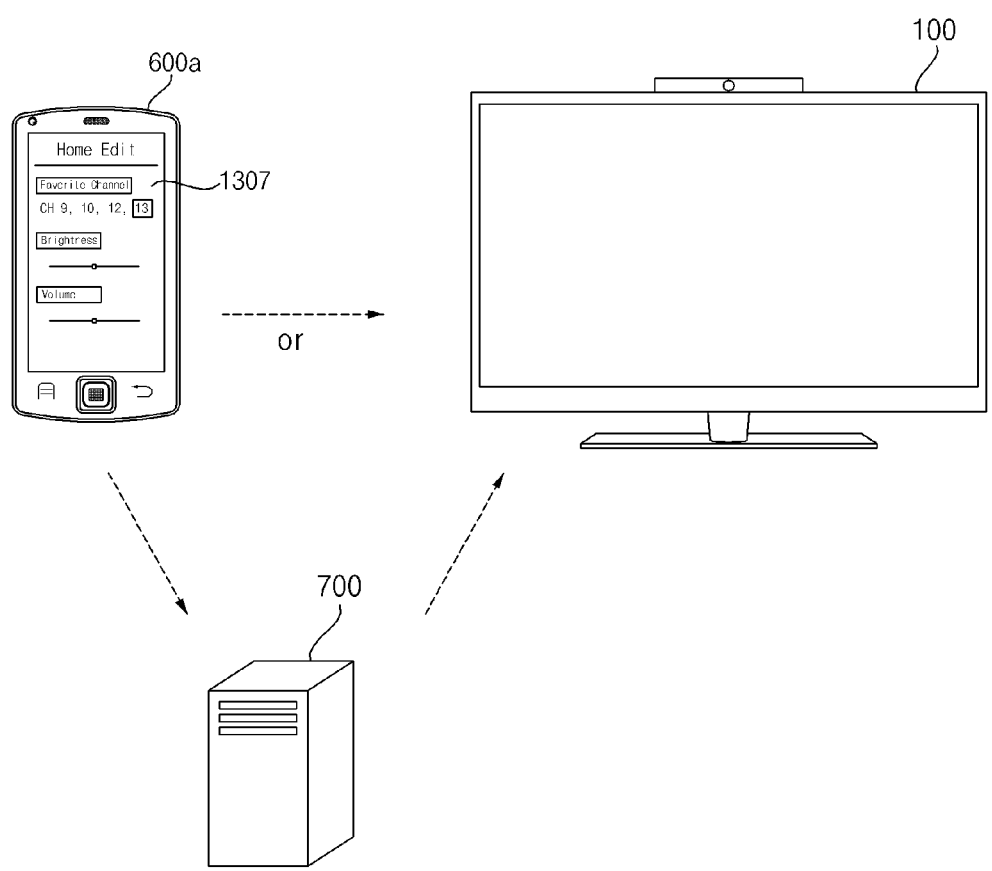

FIGS. 27A and 27B are diagrams referred to for describing sharing of home screen information by editing a home screen.

FIG. 27A illustrates that a home edit screen 1301 is displayed on the broadcast receiving apparatus 100. The home edit screen 1301 may be displayed according to user input and include a favorite channel item 1302, a brightness item 1304, a volume item 1306, etc. In addition, the home edit screen 1301 may further include an item for adding or deleting an executable application item.

FIG. 27A illustrates that channel '13' is added in the favorite channel item 1302 according to user input. When editing is completed on the home edit screen 1301, changed setting information may be transmitted to the first mobile device 600a used by the first user, directly or through the server 700.

As described above, home screen settings may be edited on the broadcast receiving apparatus 100 and shared by a mobile device, and thus user interaction may be achieved.

FIG. 27B illustrates that a home edit screen 1307 is displayed on the first mobile device 600a. Similarly to FIG. 27A, the home edit screen 1307 may be displayed according to user input and include a favorite channel item, a brightness item, a volume item, etc. In addition, the home edit screen 1307 may further include an item for adding or deleting an executable application item.

When editing is completed on the home edit screen 1307, changed setting information may be transmitted to the broadcast receiving apparatus 100 used by the first user, directly or through the server 700.

As described above, home screen settings may be edited on the broadcast receiving apparatus 100 and shared by a mobile device, and thus user interaction may be achieved.

Meanwhile, the broadcast receiving apparatus 100 may receive screen display setting information from the mobile device 600. In this case, the screen display setting information may include at least one of luminance, brightness, and contrast of a screen, and may further include volume setting information, favorite channel setting information, etc.

The screen display setting information may be received together with or separately from the home screen information. For example, the broadcast receiving apparatus 100 may receive the screen display setting information from the server 700 in addition to the home screen information. Alternatively, the broadcast receiving apparatus 100 may receive the home screen information from the server 700 based on a home screen display command and user information, and additionally receive the screen display setting information from the server 700. Otherwise, the broadcast receiving apparatus 100 may receive the screen display setting information together with the home screen information from the server 700.

The controller 170 of the broadcast receiving apparatus 100 may set and display at least one of the luminance, the brightness, and the contrast of a displayed screen, based on the received screen display setting information. In addition, the controller 170 of the broadcast receiving apparatus 100 may set volume and favorite channels. As such, a screen may be displayed according to screen display settings suitable for or preset by a user, and thus user convenience may be improved.

Figure 28:
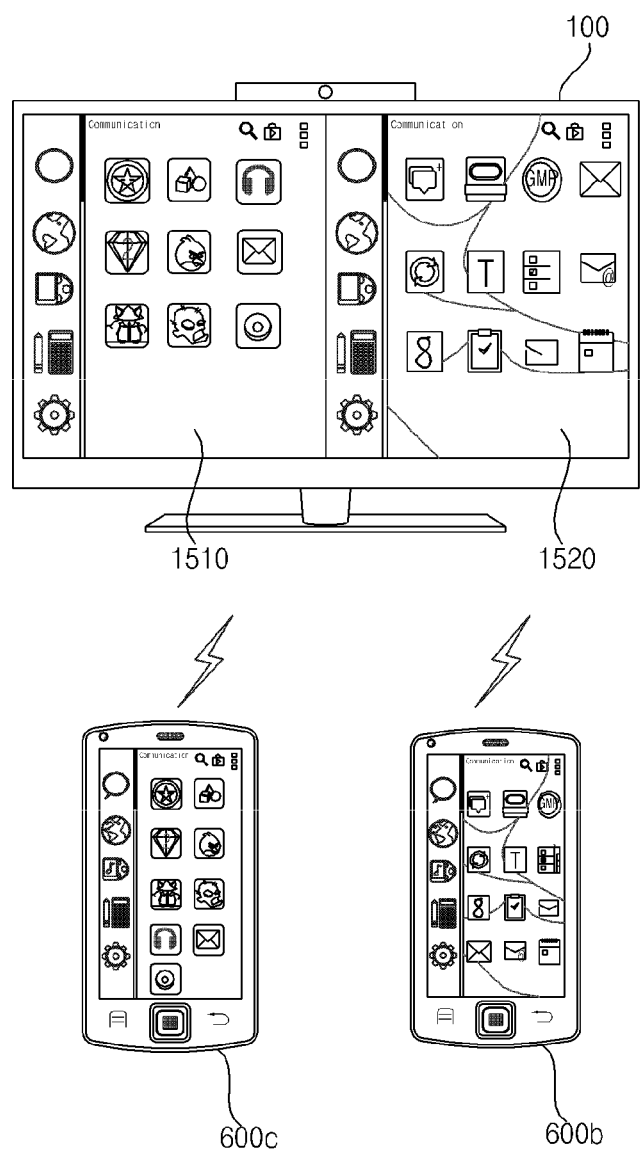

FIG. 28 illustrates that home screens for a plurality of users are displayed on the broadcast receiving apparatus 100.

If a home screen display command is received from the second mobile device 600b of the second user and another home screen display command is received from the third mobile device 600c of the third user, the broadcast receiving apparatus 100 may display at least one of a home screen of the second user and a home screen of the third user.

Thus, the broadcast receiving apparatus 100 may be connected to the server 700 using a user account of the second user (e.g., son) and a user account of the third user (e.g., mother), and receive home screen information of the second user (e.g., son) and home screen information of the third user (e.g., mother) together from the server 700.

As such, the display 180 of the broadcast receiving apparatus 100 may display a home screen 1520 of the second user (e.g., son) and a home screen 1510 of the third user (e.g., mother) together as illustrated in FIG. 28. Although the home screens 1510 and 1520 are displayed in different regions in FIG. 28, the two home screens 1510 and 1520 may be overlapped with each other. As such, a user may easily check a plurality of pieces of home screen information.

While the home screen 1510 of the third user (e.g., mother) is being displayed, if the home screen display command is received from the second mobile device 600b of the second user, the home screens 1510 and 1520 may be displayed together as illustrated in FIG. 28.

As is apparent from the above description, a broadcast receiving apparatus according to an embodiment of the present invention may receive home screen information including a background image and a plurality of execution items from another electronic device, and thus display a home screen corresponding to the home screen information. That is, the broadcast receiving apparatus may receive a shared home screen from another electronic device, scale and convert the received home screen to be suitable for the broadcast receiving apparatus, and display the converted home screen. As such, a home screen used by a specific user may be shared among a plurality of electronic devices and thus user convenience may be improved.

Particularly, since a home screen of a mobile device may be used as a home screen of a broadcast receiving apparatus (e.g., TV), the user may use the broadcast receiving apparatus as if the user uses the mobile device.

When a shared home screen is displayed, inexecutable items may be displayed distinguishably from other items and thus the user may easily check the inexecutable items.

Furthermore, when the shared home screen is displayed, the inexecutable items may be replaced with the same or similar execution items and thus user convenience may be improved.

In addition, viewing information related to a broadcast image which is currently viewed may be transmitted to a server, recommended contents may be received from the server, and the recommended contents may be replaced with the inexecutable items when the shared home screen is displayed. As such, contents suitable for a viewing history of the user may be easily executed.

A broadcast receiving apparatus according to another embodiment of the present invention receives user information of a user of a mobile device if a home screen display command is received from the mobile device, and displays a home screen for the user of the mobile device based on the user information. As such, a user-desired home screen may be easily displayed and thus user convenience may be improved.

In this case, the broadcast receiving apparatus may receive home screen information including a background image and a plurality of execution items from a server, scale and convert at least one of the background image and the execution items to be suitable for the broadcast receiving apparatus, and display the converted home screen. As such, a home screen used by the mobile device may be shared and thus user convenience may be improved.

Particularly, since a home screen of a mobile device may be used as a home screen of a broadcast receiving apparatus (e.g., TV), the user may use the broadcast receiving apparatus as if the user uses the mobile device.

When the broadcast receiving apparatus is powered off, if a home screen display command is received, the home screen may be displayed immediately after the broadcast receiving apparatus is powered on, and thus user convenience may be improved.

Besides, screen display setting information set by the mobile device may be received, at least one of luminance, brightness, and contrast of a displayed screen may be set according to the received screen display setting information, and thus screen display settings desired by the user may be easily achieved.

In addition, home screen information set on a home edit screen may be transmitted to the server, and thus the home screen information set by the broadcast receiving apparatus may also be used by the mobile device.

When a shared home screen is displayed, inexecutable items may be displayed distinguishably from other items and thus the user may easily check the inexecutable items.

Furthermore, when the shared home screen is displayed, the inexecutable items may be replaced with the same or similar execution items and thus user convenience may be improved.

A broadcast receiving apparatus and a method for operating the same according to the present invention are not restricted to the exemplary embodiments set forth herein. Therefore, variations and combinations of the exemplary embodiments may fall within the scope of the present invention.

A method for operating a broadcast receiving apparatus according to the present invention can also be embodied as processor-readable code on a processor-readable recording medium. The processor-readable recording medium is any data memory device that can store data which can thereafter be read by a processor included in the broadcast receiving apparatus. Examples of the processor-readable recording medium include read-only memory (ROM), random-access memory (RAM), CD-ROMs, magnetic tapes, floppy disks, and optical data memory devices. The processor-readable recording medium can also be distributed over network coupled computer systems so that the processor-readable code is stored and executed in a distributed fashion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A broadcast receiving apparatus comprising:
a display;
an interface configured to:
access a mobile device that stores home screen information comprising a background image and a plurality of execution items, and
receive the home screen information from the mobile device; and
a controller configured to:
scale the background image and the execution items of the home screen information received from the mobile device, at least one execution item of the plurality of execution items not being executable by the broadcast receiving apparatus based on a difference in type between the mobile device and the broadcast receiving apparatus,
display a home screen comprising the scaled background image and execution items, wherein the at least one execution item that is not executable by the broadcast receiving apparatus is displayed distinguishably from the execution items that are executable by the broadcast receiving apparatus, and
display a recommended download object indicating that a same or similar execution item corresponding to the at least one execution item is downloadable from a server,
wherein the controller receives home screen information of a first mobile device and home screen information of a second mobile device, and controls the display to display a scaled first home screen for the first mobile device together with a scaled second home screen for the second mobile device.

2. The broadcast receiving apparatus according to claim 1, wherein the interface transmits log-in information of a first user to the server, and receives home screen information for the first user from the server.

3. The broadcast receiving apparatus according to claim 2, wherein, when the log-in information of the first user is received, the controller logs the first user into the broadcast receiving apparatus based on the log-in information, and automatically accesses the server based on the logging into the broadcast receiving apparatus.

4. The broadcast receiving apparatus according to claim 1, wherein the interface receives the home screen information for a user of the mobile device based on tagging performed in response to a mobile device approaching within a predetermined distance away from the broadcast receiving apparatus.

5. The broadcast receiving apparatus according to claim 1, further comprising a broadcast receiver configured to receive a broadcast signal,
- wherein the display displays a broadcast image based on the received broadcast signal,
- wherein the interface transmits viewing information related to the displayed broadcast image, to a server, and receives recommended content information that is related to the displayed broadcast image from the server, and
- wherein the display displays the recommended content information together with the displayed broadcast image.

6. The broadcast receiving apparatus according to claim 1, wherein, when the interface receives a home screen display command and user information from a mobile device, the controller controls the display to display a home screen for a user of the mobile device among a plurality of home screens based on the home screen display command and the user information.

7. A broadcast receiving apparatus comprising:
- a display;
- an interface configured to:
- receive a home screen display command from a mobile device and user information from the mobile device, and
- receive home screen information comprising a background image and a plurality of execution items for the user of the mobile device from the mobile device or a server based on the home screen display command and the user information; and
- a controller configured to:
- scale the background image and the execution items of the home screen information received from the mobile device, at least one execution item of the plurality of execution items is not being executable by the broadcast receiving apparatus based on a difference in type between the mobile device and the broadcast receiving apparatus,
- display a home screen comprising the scaled background image and execution items, wherein the at least one execution item that is not executable by the broadcast receiving apparatus is displayed distinguishably from the execution items that are executable by the broadcast receiving apparatus, and
- display a recommended download object indicating that a same or similar execution item corresponding to the at least one execution item is downloadable from a server,
- wherein, when the home screen is displayed, if a second home screen display command is received from a second mobile device, the controller controls the display to display the home screen for the user of the mobile device together with a second home screen for a second user of the second mobile device.

8. The broadcast receiving apparatus according to claim 7, wherein, when the home screen display command is received while the broadcast receiving apparatus is in a power off state, the controller controls the broadcast receiving apparatus to be powered on and display the home screen.

9. The broadcast receiving apparatus according to claim 7, further comprising a network interface to receive screen display setting information based on the home screen display command and the user information,
- wherein the controller sets at least one of luminance, brightness, and contrast of a displayed screen according to the received screen display setting information.

10. The broadcast receiving apparatus according to claim 7, further comprising a network interface to transmit home screen information set on a home edit screen displayed on the display, to a server.

11. A method for operating a broadcast receiving apparatus, the method comprising:
- accessing a mobile device that stores home screen information comprising a background image and a plurality of execution items;
- receiving the home screen information from the mobile device;
- scaling the background image and the execution items of the home screen information received from the mobile device, at least one execution item of the plurality of execution items not being executable by the broadcast receiving apparatus based on a difference in type between the mobile device and the broadcast receiving apparatus;
- displaying a home screen comprising the scaled background image and execution items, wherein the at least one execution item that is not executable by the broadcast receiving apparatus is displayed distinguishably from the execution items that are executable by the broadcast receiving apparatus; and
- displaying a recommended download object indicating that a same or similar execution item corresponding to the at least one execution item is downloadable from a server,
- wherein the method further comprises receiving home screen information of a first mobile device and home screen information of a second mobile device, and controlling the display to display a scaled first home screen for the first mobile device together with a scaled second home screen for the second mobile device.

12. The method according to claim 11, wherein the accessing comprises transmitting log-in information of a first user to the server, and
- wherein the receiving comprises receiving home screen information for the first user from the server.

13. The method according to claim 11, wherein the scaling comprises at least one of changing of an aspect ratio of the home screen, switching between a landscape mode and a portrait mode of the home screen, and resizing of an image or text in the home screen.

* * * * *